United States Patent
Burge et al.

(10) Patent No.: US 9,934,636 B1
(45) Date of Patent: *Apr. 3, 2018

(54) ACCESS MANAGEMENT AND REPORTING TECHNOLOGY

(71) Applicant: Alarm.com Incorporated, Tysons, VA (US)

(72) Inventors: Gregory Le Burge, Bend, OR (US); Stanley Reed Earnshaw, Wilsonville, OR (US)

(73) Assignee: Alarm.com Incorporated, Tysons, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/369,292

(22) Filed: Dec. 5, 2016

Related U.S. Application Data

(63) Continuation of application No. 14/987,200, filed on Jan. 4, 2016, now Pat. No. 9,514,584, which is a
(Continued)

(51) Int. Cl.
*H04L 9/32* (2006.01)
*G07C 9/00* (2006.01)

(52) U.S. Cl.
CPC ..... *G07C 9/00571* (2013.01); *G07C 9/00309* (2013.01); *G07C 9/00817* (2013.01);
(Continued)

(58) Field of Classification Search
CPC ...... G07C 9/00182; G07C 2009/00793; G07C 9/00817; G07C 9/0069; G07C 9/00015;
(Continued)

(56) References Cited

U.S. PATENT DOCUMENTS

| 7,170,998 B2 * | 1/2007 | McLintock ........ G07C 9/00103 340/5.23 |
| 7,196,610 B2 | 3/2007 | Straumann et al. |

(Continued)

FOREIGN PATENT DOCUMENTS

| WO | WO 2004077848 A3 | 1/2005 |
| WO | WO 2009088901 A1 | 7/2009 |

OTHER PUBLICATIONS

U.S. Non-Final Office Action for U.S. Appl. No. 13/284,323 dated Apr. 11, 2014, 25 pages.
U.S. Non-Final Office Action for U.S. Appl. No. 14/987,200 dated Feb. 10, 2016, 17 pages.
U.S. Final Office Action for U.S. Appl. No. 14/987,200 dated Aug. 10, 2016, 15 pages.
(Continued)

*Primary Examiner* — Sisay Yacob
(74) *Attorney, Agent, or Firm* — Fish & Richardson P.C.

(57) ABSTRACT

An access management and reporting system includes a keysafe that is located outside of a building and a communication system that is located within the building. The communication system is configured to perform, over a short-range wireless communication protocol, two-way communication with a communication module of the keysafe. The system also includes a server that is located remote from the building and the keysafe. The server is configured to perform, over a long-range communication protocol, two-way communication with the communication system located within the building, is configured to manage access to the keysafe, and is configured to handle reporting related to access of the keysafe.

20 Claims, 19 Drawing Sheets

Related U.S. Application Data continuation of application No. 14/622,209, filed on Feb. 13, 2015, now Pat. No. 9,230,374, which is a continuation of application No. 13/284,323, filed on Oct. 28, 2011, now Pat. No. 8,957,757.

(60) Provisional application No. 61/407,751, filed on Oct. 28, 2010.

(52) U.S. Cl.
CPC ............... G07C 9/00896 (2013.01); *G07C 2009/00325* (2013.01); *G07C 2009/00825* (2013.01); *G07C 2009/00936* (2013.01)

(58) Field of Classification Search
CPC ............ G07C 9/00103; G07C 9/00007; G07C 9/00142; B60R 25/24; A01B 12/006
See application file for complete search history.

(56) References Cited

U.S. PATENT DOCUMENTS

| | | | |
|---|---|---|---|
| 8,437,740 | B2 | 5/2013 | Despain et al. |
| 2002/0099945 | A1* | 7/2002 | McLintock ........ G07C 9/00103 713/186 |
| 2003/0151493 | A1 | 8/2003 | Straumann et al. |
| 2004/0219903 | A1 | 11/2004 | Despain et al. |
| 2007/0096870 | A1 | 5/2007 | Fisher |
| 2007/0290797 | A1 | 12/2007 | Harkins et al. |
| 2008/0246587 | A1 | 10/2008 | Fisher |
| 2010/0283579 | A1 | 11/2010 | Kraus et al. |
| 2011/0053557 | A1 | 3/2011 | Despain et al. |

OTHER PUBLICATIONS

U.S. Notice of Allowance for U.S. Appl. No. 14/987,200 dated Oct. 26, 2016, 8 pages.

* cited by examiner

ID
ACCESS MANAGEMENT AND REPORTING TECHNOLOGY

CROSS REFERENCE TO RELATED APPLICATIONS

This application is a continuation (and claims the benefit of priority under 35 USC 120) of U.S. application Ser. No. 14/987,200, filed Jan. 4, 2016, now allowed, which is a continuation of U.S. application Ser. No. 14/622,209, filed Feb. 13, 2015, now U.S. Pat. No. 9,230,374, issued Jan. 5, 2016, which is a continuation of U.S. application Ser. No. 13/284,323, filed Oct. 28, 2011, now U.S. Pat. No. 8,957,757, issued Feb. 17, 2015, which claims the benefit of U.S. Provisional Application No. 61/407,751, filed Oct. 28, 2010. All of these prior applications are incorporated herein by reference in their entirety for all purposes.

TECHNICAL FIELD

This disclosure relates to access management and reporting technology.

BACKGROUND

Mechanical keys remain the primary method of access to millions of locations, such as restaurants, retail, banks, small businesses, public sector facilities, and vacation properties. However, the use of mechanical keys creates a variety of challenges for business owners, managers, and homeowners. For example, an employee's unreturned, lost or stolen key may require a costly re-keying. Additionally, a mechanical key, by itself, leaves no access audit trail, eliminating the ability to determine who accessed a specific location and when that location was accessed. Moreover, after-hours deliveries and services require the presence of an employee or the distribution of keys to third party vendors.

SUMMARY

Techniques are described for access management and reporting technology.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for an integrated access management and reporting system for electronic lockboxes. In some implementations, a server manages electronic lockboxes that release physical keys based on entry of a proper passcode. The server may engage in two-way communication with the electronic lockboxes to remotely program and receive information from the electronic lockboxes.

Figure 1:
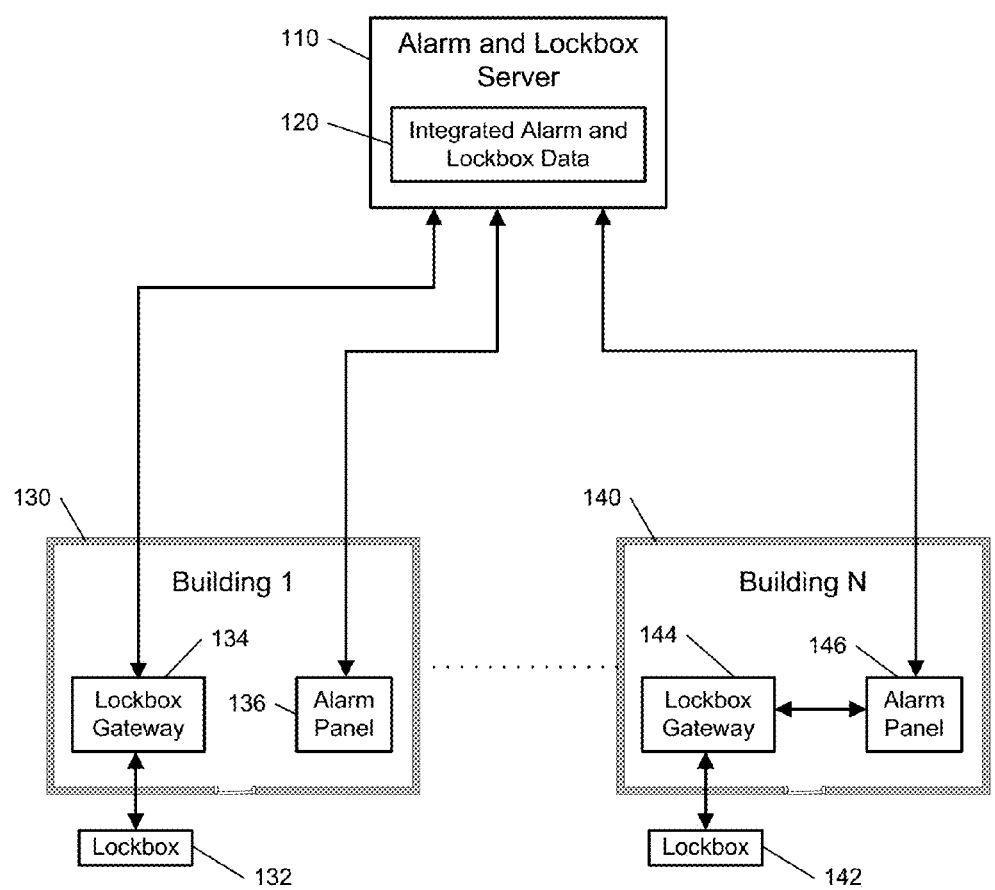
FIG. 1 is a schematic view of an example of an integrated access management and reporting system.
Figure 2:
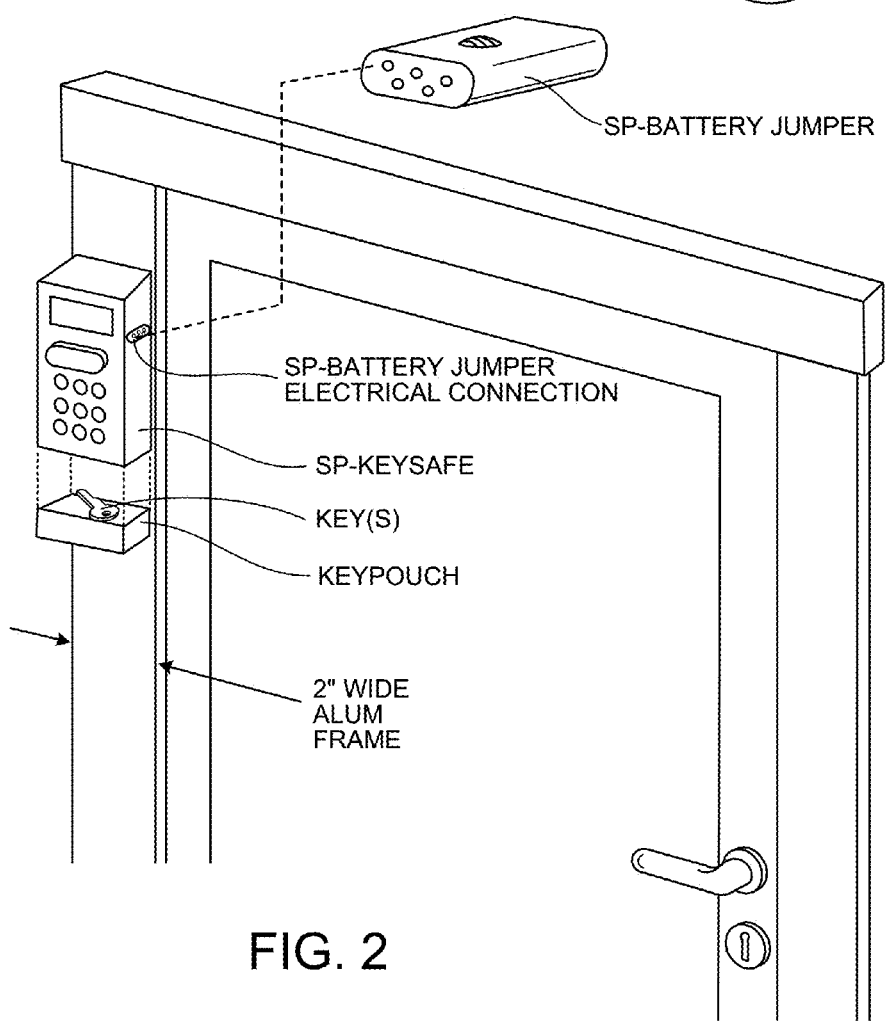
FIG. 2 is a schematic view of another example of an integrated access management and reporting system.
Figure 3:
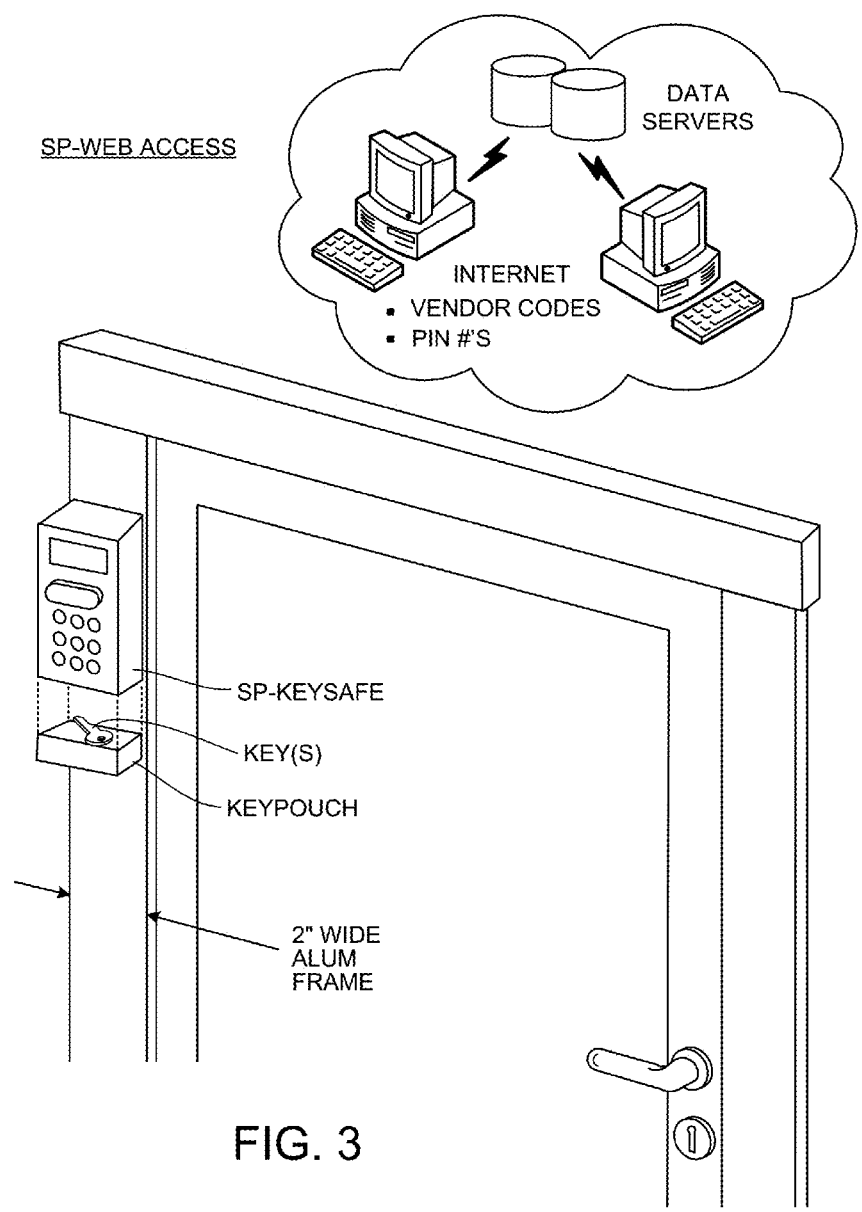
FIG. 3 is a schematic view of an additional example of an integrated access management and reporting system.
Figure 4:
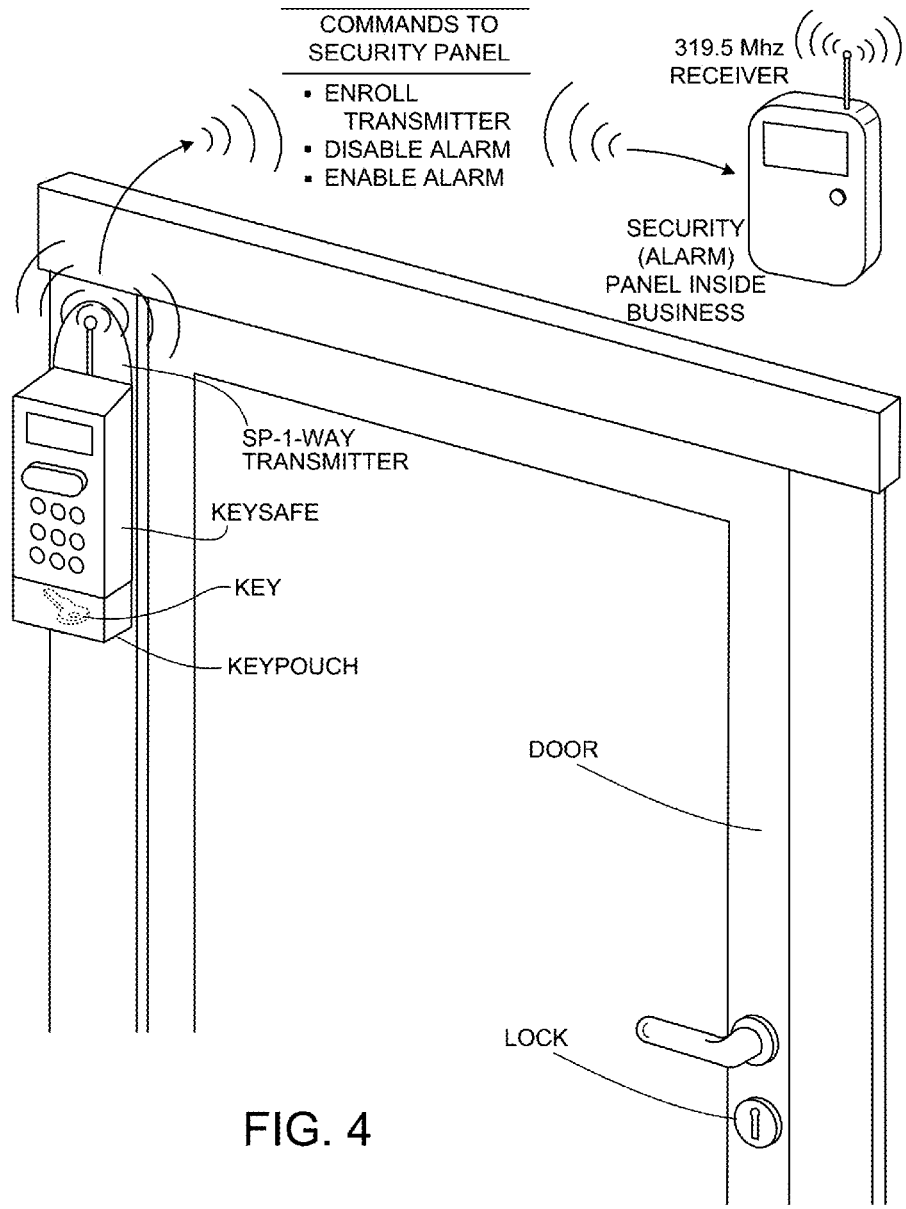
FIG. 4 is a schematic view of a further example of an integrated access management and reporting system.
Figure 5:
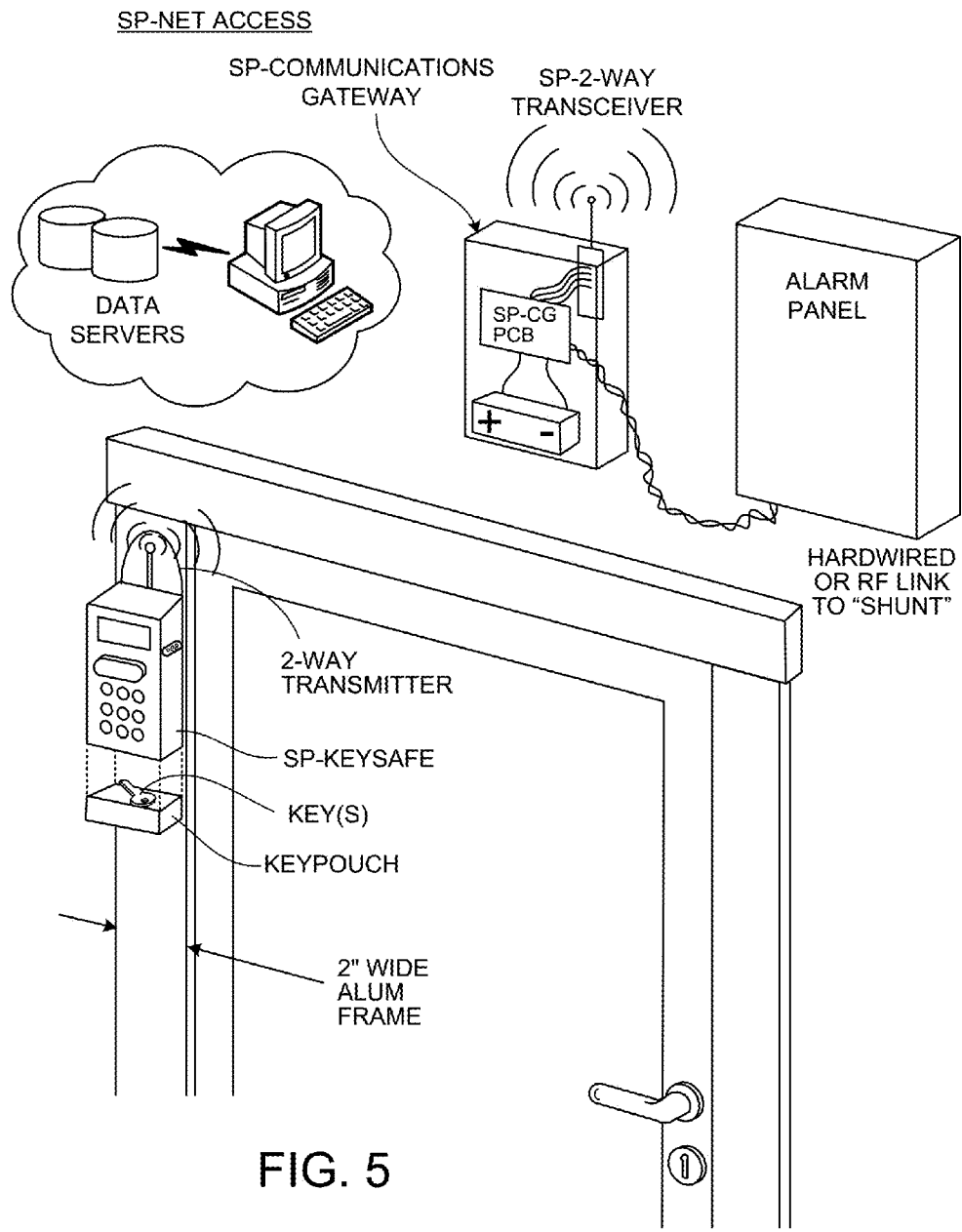
FIG. 5 is a schematic view of a further example of an integrated access management and reporting system.

FIG. 1 illustrates an example access management and reporting system 100. The system 100 includes an alarm and lockbox server 110 that manages alarm systems and/or electronic lockboxes located at multiple, different buildings (e.g., the building 130 and the building 140). The multiple, different buildings may be operated by different entities (e.g., owned by different entities) with single entities operating groups of buildings. The server 110 may maintain data that defines which entities are associated with which buildings (or the alarm systems and/or electronic lockboxes at the buildings) and maintain permission data that sets which users are allowed to view data and perform control operations for alarm systems and/or electronic lockboxes managed by the server 110. The multiple, different buildings may be any type of buildings, including commercial retail buildings, residential buildings, office buildings, or any building that uses an alarm system and/or an electronic lockbox. Any other structure (e.g., a cabinet, etc.) that uses an alarm system and/or an electronic lockbox may be managed by the server 110. Although FIG. 1 illustrates two buildings for brevity, the server 110 may manage alarm systems and/or electronic lockboxes for many more buildings and/or structures.

The system 100 also includes electronic lockbox and alarm system components located at each of the buildings. As shown, the building 130 includes an electronic lockbox 132 located at an exterior door of the building 130, a lockbox gateway 134 located within the building 130, and an alarm panel 136 located within the building 130. The electronic lockbox 132 may include a user input device that receives user input of a passcode and a housing that secures a physical key that unlocks and locks a physical door of an entrance to the building 130. The electronic lockbox 132 also may include a communication module that performs two-way communication over a short-range wireless communication protocol and a processor that controls the housing to allow access to the physical key secured within the housing based on entry of a proper passcode through the user input device.

The electronic lockbox 132 engages in two-way communications with the lockbox gateway 134 over the short-range wireless communication protocol. In this example, the lockbox gateway 134 includes communication components that allow the lockbox gateway 134 to perform two-way communication with the lockbox 132 over the short-range wireless communication protocol and to perform two-way communication with the server 110 over a long-range communication protocol (e.g., a long-range wired or wireless communication protocol). The lockbox gateway 134 may serve as an intermediary between the server 110 and the lockbox 132 to enable the server 110 to remotely program and manage the lockbox 132 and also to receive reports when events (e.g., entry of a correct passcode, entry of an incorrect passcode, return of a physical key, etc.) occur at the lockbox 132.

In some examples, the lockbox gateway 134 performs relatively few processing operations and serves to primarily exchange communications between the lockbox 132 and the server 110. In these examples, the lockbox 132 includes an electronic storage device that stores passcodes that are valid to open the lockbox 132 and the processor of the lockbox 132 performs the decision making processing to determine whether or not a proper passcode has been entered. When the server 110 remotely manages passcodes (e.g., adds passcodes, deletes passcodes, changes passcodes, etc.) for the lockbox 132, the lockbox gateway 134 relays commands from the server 110 to the lockbox 132 and the processor of the lockbox 132 interprets the commands and performs adjustments to the electronic storage device needed to modify the valid passcodes as instructed. For reporting lockbox events, the lockbox 132 sends reports of events to the lockbox gateway 134 and the lockbox gateway 134 relays the reports to the server 110. The server 110 stores the reports and may perform reporting operations for the entity operating the building 130 such that the entity (e.g., owner) may be alerted to events at the lockbox 132 and may view a history of events at the lockbox 132.

In other examples, the lockbox 132 performs relatively few processing operations and the lockbox gateway 134 performs control processing for the lockbox 132. In these examples, the lockbox gateway 134 includes an electronic storage device that stores passcodes that are valid to open the lockbox 132 and also includes a processor that performs the decision making processing to determine whether or not a proper passcode has been entered. For instance, when a user inputs a passcode at the lockbox 132, the lockbox 132 merely forwards the entered passcode to the lockbox gateway 134 and the lockbox gateway 134 determines whether the passcode is valid. Based on the determination, the lockbox gateway 134 sends a command back to the lockbox 132 to either deny the entered passcode or allow access to the physical key secured in the lockbox 132. When the server 110 remotely manages passcodes (e.g., adds passcodes, deletes passcodes, changes passcodes, etc.) for the lockbox 132, the lockbox gateway 134 interprets the commands and performs adjustments to the electronic storage device needed to modify the valid passcodes as instructed. The lockbox 132 does not need to receive any communication related to the management of passcodes since the lockbox gateway 134 stores the valid passcodes. For reporting lockbox events, the lockbox gateway 134 sends reports of events to the server 110. The server 110 stores the reports and may perform reporting operations for the entity operating the building 130 such that the entity (e.g., owner) may be alerted to events at the lockbox 132 and may view a history of events at the lockbox 132.

In some implementations, the lockbox gateway 134 monitors for tampering or malfunction of the lockbox 132. In these implementations, the lockbox gateway 134 detects when communication with the lockbox 132 has been lost. For instance, the lockbox gateway 134 may periodically send pinging communications to the lockbox 132 and detect that communication has been lost when the lockbox 132 fails to respond to the pinging communications. When the lockbox gateway 134 detects that communication with the lockbox 132 has been lost, the lockbox gateway 134 sends an alert to the server 110 and the server 110 relays the alert as an electronic message (e.g., electronic mail message, text message, etc.) to an entity responsible for servicing the lockbox 132.

The lockbox 132 also may perform battery or power management operations. For instance, the lockbox 132 may operate on battery power and have a component that measures an amount of battery power remaining for the lockbox 132. The processor of the lockbox 132 may periodically check the amount of battery power remaining for the lockbox 132 and compare the current amount of battery power to a threshold. The processor of the lockbox 132 determines whether the current amount of battery power has fallen below the threshold based on the comparison and, in response to a determination that the current amount of battery power has fallen below the threshold, the processor of the lockbox 132 controls the communication module of the lockbox 132 to send a battery alert to the lockbox gateway 134. The lockbox gateway 134 relays the battery alert to the server 110 and the server 110 relays the battery alert as an electronic message (e.g., electronic mail message, text message, etc.) to an entity responsible for servicing the lockbox 132.

The building 130 also includes an alarm panel 136 located within the building. The alarm panel 136 may be part of a security system that monitors the building 130 based on data from various sensors located throughout the building 130. The security system may sense many types of events or activities associated with the building 130 and the sensed events or activities may be leveraged in performing monitoring and reporting features. The security system may include a controller that communicates with the alarm panel 136 (or is part of the alarm panel 136). The controller may be configured to control the security system. In some examples, the controller may include a processor or other control circuitry configured to execute instructions of a program that controls operation of the security system. In these examples, the controller may be configured to receive input from sensors, detectors, or other devices included in the security system and control operations of devices included in the security system or other household devices (e.g., a thermostat, an appliance, lights, etc.).

The security system also includes one or more sensors or detectors. For example, the security system may include multiple sensors, including a contact sensor, a motion sensor or any other type of sensor included in an alarm system, security system, or monitoring system. The sensors also may include an environmental sensor, such as a temperature sensor, a water sensor, a rain sensor, a wind sensor, a light sensor, a smoke detector, a carbon monoxide detector, an air quality sensor, etc. The sensors further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, bathroom usage sensors, food consumption sensors, etc. In some examples, the sensors may include a radio-frequency identification (RFID) sensor that identifies a particular article that includes a pre-assigned RFID tag.

The server 110 provides monitoring and security services for the building 130 by exchanging electronic communications with the alarm panel 136. For instance, the server 110 and the alarm panel 136 engage in two-way communications over a long-range communication protocol (e.g., a long-range wired or wireless communication protocol). The server 110 may be configured to monitor events generated by the alarm panel 136 based on output of sensors and detectors of the security system. The server 110 may exchange electronic communications with the alarm panel 136 to receive information regarding alarm events detected by the alarm panel 136 and to control operations of the security system.

The server 110 may store sensor and image data received from the alarm panel 136 and perform analysis of sensor and image data received from the alarm panel 136. Based on the analysis, the server 110 may communicate with and control aspects of the alarm panel 136, one or more user devices, and a central monitoring station that dispatches emergency services in response to alarm events. For instance, the server 110 may send alerts/notifications to one or more user devices (e.g., mobile devices, computers, etc.) based on alarm data received from the alarm panel 136. The server 110 also may process an alarm event received from the alarm panel 136 and forward the alarm event to a central monitoring station for handling by an operator that can dispatch emergency services to assist with the alarm event.

Because the server 110 receives data related to access of the lockbox 132 and also receives data from the alarm panel 136, the server 110 maintains an integrated database 120 that stores integrated alarm and lockbox data. For example, the server 110 may store data describing access events at the lockbox 132 with data describing events detected by the alarm panel 136. In this example, the server 110 may link lockbox access data with alarm data to define a more complete picture of how the building 130 is being used when accessed through the lockbox 132. The server 110 may detect an access event at the lockbox 132 and detect a return key event at the lockbox 132 and link these events with all of the alarm data collected by the alarm panel 136 between the access event and the return key event. In this manner, the server 110 defines a more complete record of how the building 130 is being accessed and who is accessing the building 130 when the lockbox 132 is being used. The server 110 may analyze the integrated alarm and lockbox data stored in the database 120 to provide alerts/reports based on both alarm and lockbox data and also to verify that the building 130 is being properly accessed when the lockbox 132 is used.

In some examples, the server 110 may use lockbox data to assist with detecting alarm events. In these examples, the server 110 may determine whether the lockbox 132 has been accessed and/or whether the lockbox 132 is operational to assist in determining whether an alarm event needs to be reported to the central monitoring station. For instance, when the security system detects a potential alarm event shortly after a proper access of the lockbox 132 has been made, the server 110 may classify the potential alarm event as more likely being a false alarm than if the proper access of the lockbox 132 had not occurred prior to the potential alarm event. In this regard, the server 110 may delay reporting the potential alarm event to the central monitoring station to allow more time for the user that accessed the lockbox 132 to disarm the security system or the owner of the building 130 (or other authorized user) to confirm that the access was permissible.

In addition, when reporting an alarm event to the central monitoring station, the server 110 may provide lockbox data to the central monitoring station in addition to the alarm event to assist the central monitoring station with handling the alarm event. For example, the server 110 may provide the central monitoring station with data indicating whether or not the lockbox 132 has been recently accessed and/or whether or not the lockbox 132 is operating properly.

In some implementations, events at the lockbox 132 may be used to control the alarm panel 136. In these implementations, the server 110 may receive a report of an event at the lockbox 132 and then send a control command to the alarm panel 136 based on the event at the lockbox 132. For example, when the server 110 receives a report of an access event at the lockbox 132 and the alarm panel 136 is in an armed state, the server 110 may send a command to the alarm panel 136 to change from the armed state to the disarmed state. This may enhance the convenience of a user accessing the building 130 using the lockbox 132 because the user does not have to separately disarm the security system upon entry. Also, the entity operating the building may leave the passcode to the security system secret from the user accessing the building 130 using the lockbox 132, thereby limiting the distribution of the passcode to the security system.

In another example, when the server 110 receives a report of a return key event at the lockbox 132 and the alarm panel 136 is in a disarmed state, the server 110 may send a command to the alarm panel 136 to change from the disarmed state to the armed state. This may help reduce the likelihood that the building 130 is left in an unmonitored state by virtue of a user accessing the building 130 using the lockbox 132 and forgetting to arm the security system when leaving the building 130.

Similar to the building 130, the building 140 includes an electronic lockbox 142 located at an exterior door of the building 140, a lockbox gateway 144 located within the building 140, and an alarm panel 146 located within the building 140. The electronic lockbox 142, the lockbox gateway 144, and the alarm panel 146 are similar to the electronic lockbox 132, the lockbox gateway 134, and the alarm panel 136 and may perform operations similar those described above as being performed by the electronic lockbox 132, the lockbox gateway 134, and the alarm panel 136. The difference shown for the building 140 as compared to the building 130 is the communication with the server 110. As shown, unlike the lockbox gateway 134, the lockbox gateway 144 does not communicate with the server 110 over a long-range communication protocol. Rather, the lockbox gateway 144 communicates with the alarm panel 146 over a short-range communication protocol (e.g., a wired or wireless short-range communication protocol) and the alarm panel 146 relays communications between the lockbox gateway 144 and the server 110. In this example, the lockbox gateway 144 may directly control operations of the alarm panel 146 based on events at the lockbox 142 without having to communicate with the server 110.

In some examples, a lockbox gateway may not be used. In these examples, the lockbox may communicate directly with the server 110 over a long-range communication protocol. Alternatively, the lockbox may communicate directly with an alarm panel over a short-range communication protocol and the alarm panel may perform the operations described as being performed by a lockbox gateway in addition to the operations described as being performed by the alarm panel.

Integrated access management and reporting systems described throughout the present disclosure may provide one or more of the following:

Keyless access (which may eliminate or reduce the distribution of mechanical keys);

Access accountability (such as recording each access by individual, date and time);

Access control (such as providing access based on a single use, time of day, day of week, time bound access);

Display or transmit access information (such as who accessed, when was it accessed, and where was it accessed);

Eliminate or reduce false alarms (such as by providing interface access with alarm system);

Enable keyless emergency access (such as by using one time codes);

Facilitate "dark delivery" (such as by providing unattended after-hours access); and Alert/event notifications—wireless notification when a scheduled event does not take place (such as a store opening or closing).

Integrated access management and reporting systems may include any suitable structure, as shown in FIGS. 1-6. Examples of the integrated access management and reporting systems are provided below, in addition to commercial and residential doors, the integrated access management and reporting systems may be used on any device with a mechanical lock. From file cabinets, trailers, storage cabinets, to millions of other locations/devices, the integrated access management and reporting systems may provide a simple, low cost, yet technically sophisticated solution in a mechanical key environment.

1. Product Systems Overview

The integrated access management and reporting system may include one or more of the following system levels:

SP-Access
SP-Web
SP-Security
SP-Net

Each integrated access management and reporting system may include a ruggedized on-premise electronic keysafe (also referred to as "SP-Keysafe" or "PointSafe"). The SP-Keysafe may be securely mounted on or adjacent to a door (or point of access). Using an assigned PIN number, employees, vendors, and service providers may open the SP-Keysafe to gain access to the facility key. Each access may be recorded by user, date, and/or time.

An optional SP-Battery Jumper may be offered in case of internal battery discharge or failure. RF communication system levels may require a SP-Communications Gateway device located inside the building. The system levels may be characterized by their external communication ability and connectivity with security panels and web based user/administrator portal. Service levels may allow varying functionality depending upon the installation and user needs.

1.1. SP-Access

The SP Access solution may deliver a low cost, electronic key storage/access management solution that may be easy to install. At the core of the SP Access solution is the Keysafe, the physical vault that contains the key. No external communication beyond web registration may be provided for this system. The web portal may be used for initial product registration. Valid PIN numbers can be selected from the web portal, but ability to add or manage information on the relational database may not be provided. One Time and Limited Time PIN numbers may be used with this level of devices.

1.1.1. Keysafe

A ruggedized locking vault that may protect a key and may be accessed via a 12-key input pad and small LCD screen for instructions. A piezo sounder may provide audio confirmation of keypad entries and may provide varying tones for other situations. In addition, red and green LED's may provide steady or blinking illumination for various input situations. The vault may be visually obscured by a plastic cover to minimize visual interest and dissuade tampering. The 2" width may enable the Keysafe to be installed on 2" standard retail glass store front doors. When mounted on a glass store front doorframe the cover may allow the device to 'blend' into the door frame.

1.1.1.1. Keysafe Installation Kit

An installation kit comprised of an Installation Instructions pamphlet and a plurality of, for example, flathead lag screws may be packaged in, for example, a zip lock polyethylene bag and included with every Keysafe.

1.1.1.2. Keysafe Locksmith Instruction Document

In the event a Keysafe is not functioning and cannot be persuaded to open the keypouch, an instructional document may be provided to dealers that explains how and where to cut the safe to remove it. A blade or other cutting instrument may be recommended and locations around the keypouch may be identified for a series of cuts that may expose the tab that releases the entire Keysafe from its mounting bracket.

1.1.1.3. Keysafe Audio Tones

The Keysafe may produce audio tones for one or more of the following situations:

1. Every keypad entry (SINGLE SHORT TONE)
2. Every successful menu selection with <OK> button (SINGLE SHORT TONE)
3. Every entry that triggers Error event (3 LONG TONES)
4. ACCESS Key or ACCESS Key DISABLE Alarm (2 SHORT TONES)
5. ACCESS Key ENABLE Alarm (LONG TONE followed by 1 SHORT TONE)

1.1.1.4. Keysafe LED Displays

The Keysafe may illuminate red and green LED's for the following situations:

1. Every keypad entry (SINGLE RED FLASH)
2. Every successful menu selection with <OK> button (SHORT GREEN FLASH ½ SEC)
3. Every entry that triggers Error event (3 LONG RED FLASHES 1 SEC EACH)
4. ACCESS Key/ACCESS Key DISABLE Alarm (SOLID GREEN FOR 5 SECONDS)
5. ACCESS Key ENABLE Alarm (SOLID GREEN FOR 4 SECONDS FOLLOWED BY 2 LONG RED FLASHES 1 SEC EACH)

1.1.1.5. PIN Code Management

After product registration, the management of PIN codes may be accomplished on-line.

1.1.1.6. SP-Battery Jumper

A battery-powered device may provide external power in the event of battery failure on the Keysafe.

1.2. SP-Web

No communication may occur between the Web application and the integrated access management and reporting system. The Keysafe microprocessor and imbedded firmware may have the ability to decrypt codes input into the box to determine their validity without any connectivity to the web. The processes may utilize the unique serial number of the Keysafe to generate valid codes, and calendar events may trigger the firmware on the Keysafe and/or the SP-Web Portal database to generate new possible codes.

1.3. SP-Security

This system level may include all the components, functions and capabilities found in the SP-Access and SP-Web levels and may add the capability of the SP-Keysafe functioning as a wireless keypad to a security panel, such as a GE/UTC, Simon XT or Concord NX security panel. This interface may provide an arm/disarm interface to the security panel. Without a Gateway, no communication to the relational database on the web portal is performed.

1.3.1. Two Way Transceiver

The Security system may require a device that sends signals to the alarm panel to arm, disarm, and/or enroll the transmitter. The Two Way Transceiver may operate in one-way mode, which may allow only a select number of commands. The transmitter may send messages to the receiver on the security panel utilizing short-range wireless protocols. The 319.5 MHz frequency may be utilized for communication between the Gateway and Keysafe RF circuit. The Tiny Encryption Algorithm (TEA) may be used to provide wireless encryption protection and maintain a relatively small transmission packet size.

1.4. SP-Net

The Networked (SP-Net) system level may include all of the features and functions found in SP-Access and SP-Web system levels while adding two way communication and Keysafe programming via the Web Portal and Gateway. The Networked system may allow for web reporting of Keysafe RF events and for web programming of the RF keysafe. Additionally, the Networked system may support Key Switch connectivity alarm panels and direct connectivity and activation of accessory devices, such as mag locks. The Networked system may include a Keysafe RF device, a Gateway and Connect web services.

1.4.1. Gateway

The Gateway may communicate with the Keysafe via a short-range wireless communication link (e.g., the 319.5 MHz link). The Gateway via the GPRS transceiver may transmit access and/or programming data to the Web Portal and receive Keysafe programming information from the Web Portal application.

The enclosure may be wall-mounted, and may be powered by, for example, an external transformer that may provide 6-15 VDC from either a 110 or 220 VAC source. A 1.2 Amp-hour battery may be included for back-up. A four-position terminal block with two positions for shunting an alarm and two positions for switching an accessory device (such as a magnetic door lock or security camera) may be included. Power may be provided to the general packet radio service (GPRS) printed circuit board (PCB) via a 22-pin connector. Alternatively, the PCB may be a transmission control protocol (TCP) PCB to provide TCP/IP functionality. This system level also may allow a security dealer to use the Key switch contact output in the Gateway for hard-wired security panel shunting.

1.4.2. Two Way Transceiver

The two-way transceiver may have two modes: one-way and two-way. SP-Security level users may be set up to utilize the one-way mode. The transmitter may send messages to the receiver on the security panel utilizing short-range wireless protocols.

SP-Net level installations may require two modules, one in the Keysafe and another in the Gateway. This may allow communication back from the Web Portal to the Keysafe via the Gateway. The 319.5 MHz frequency may be utilized. The Tiny Encryption Algorithm (TEA) may be used to provide wireless encryption protection and maintain a relatively small transmission packet size.

1.4.3. PointCam

The PointCam may be an 900 MHz transceiver that is integrated into the Gateway module itself. It may provide the ability to transmit JPEG images from cameras turned on by infrared detection.

1.5. Service Levels

Various service levels may be provided to users of the integrated access and reporting systems described throughout this disclosure.

1.5.1. Point Codes

In some examples, the standalone, basic product may provide no communication between the Web portal and the Entry device. The Keysafe determines if PIN codes are valid by comparing them to the internal array of PIN codes and their state; the PIN code must be valid and have its state set to Active. Deleted PIN codes will have their state set to In-Active.

1.5.1.1. Code Creator

During product registration or whenever an Administrator visits the web portal, they may be given the opportunity to accept the "Code Creator" option. This option may allow the creation of both One Time and Limited Time PIN numbers especially attractive for emergency responders and property management companies. The administrator may use the PointCodes online database to store the names and contact info for individuals who they have assigned one-time or time bound codes. RF installations may use the "Code Creator" to allow additional access control and wireless security pad functionality.

1.5.2. Point Connect

PointConnect may have all of the functionality of PointCodes with the additional full relational database functionality via the web portal.

1.6. Web Portal

The Web Portal may be comprised of a website user interface and back end data management being provided by any suitable entity on existing network resources. The Web Portal Application may offer programming options not available locally via the Keysafe keypad.

1.7. Panel Specific Systems

These system levels may provide the end user all of the capabilities and functions found in the Networked Access system level. However, these system levels may not employ the use of the stand-alone Communications Module, but utilize the built-in RF communications found in each that will work with the Two Way Transceiver. Examples of panel specific systems include SP-GE Security Info (Simon XT), SP-GE Security Info (Concord NX), and SP-GE Security ADC.

2. Commands

This section may define data transactions between different devices including those commands initiated via the Internet-based application. Some transactions may occur in multiple places. Their description may be given in the first applicable section in which they occur. Capitalized letters are suggested characters that may appear in a two-line, eight-character-wide LCD screen.

First Example Command Matrix

The matrices below show example sets of individual commands. The Keysafe may be able to perform one or more of the following actions and the lists further describe which level of users may have which commands available.

| Command | SP - System Level Available | | | | Keysafe Menu | | | System | Web Portal | |
|---|---|---|---|---|---|---|---|---|---|---|
|  | ACCESS | WEB | SECURITY | NET | Program | Access | History | Generated | Program | History |
| Change Admin PIN | X | X | X | X | X | | | | X | |
| Add manager PIN | X | X | X | X | X | | | | X | |
| Delete Manager PIN | X | X | X | X | X | | | | X | |
| Add User PIN | X | X | X | X | X | | | | X | |
| Delete User PIN | X | X | X | X | X | | | | X | |
| Add Vendor PIN | X | X | X | X | X | | | | X | |
| Delete Vendor PIN | X | X | X | X | X | | | | X | |
| Set Time | X | X | X | X | X | | | | X | |
| Enroll Transmitter | | | X | X | X | | | | | |
| Enroll DWS | | | X | X | X | | | | | |
| Enable Keypad Only | | | X | X | X | | | | | |
| Set User Access Hours | | | | X | X | | | | X | |
| Set Vendor Access Hours | | | | X | X | | | | X | |
| Add General Vendor PIN | | | | X | | | | | X | |
| Delete General Vendor PIN | | | | X | | | | | X | |
| Add Limited Time PIN | | X | X | X | | | | | X | |
| Delete Limited Time PIN | | X | X | X | | | | | X | |
| Add One Time PIN | | X | X | X | | | | | X | |
| Delete One Time PIN | | X | X | X | | | | | X | |
| Add Open Now PIN | | | | X | | | | | X | |
| Open Now | | | | X | | | | | | |
| Access Key | X | X | X | X | | X | | | | |
| Access Key Enable Alarm | | | X | X | | X | | | | |
| Access Key Disable Alarm | | | X | X | | X | | | | |
| Enable Alarm | | | X | X | | X | | | | |
| Disable Alarm | | | X | X | | X | | | | |
| Accessory On | | | X | X | | X | | | | |
| Accessory Off | | | X | X | | X | | | | |
| * (power up) | X | X | X | X | | X | | | | |
| *11 (power up for OPEN NOW) | | | | X | | X | | | | |
| View Date Activity | X | X | X | X | | | X | | | X |
| View PIN Activity | X | X | X | X | | | X | | | X |
| Review PIN | X | X | X | X | | | X | | | X |
| Low Battery | X | X | X | X | | | | X | | |
| Incorrect PIN | X | X | X | X | | | | X | | |
| Login Attempts Exceeded | | | | X | | X | | | | |
| # PINS Exceeded | X | X | X | X | | | | | X | |
| Record Access | X | X | X | X | | | | | X | |
| Record Incorrect Code Entry | X | X | X | X | | | | | X | |
| Reset Clock (auto correction) | X | X | X | X | | | | | X | |
| Read Clock | X | X | X | X | | | | | X | |

| Command | User Type Command is Available To | | | | | | | |
|---|---|---|---|---|---|---|---|---|
|  | Admin | Manager | User | Vendor | General Vendor | One Time User | Limited Time User | Open Now |
| Change Admin PIN | X | | | | | | | |
| Add manager PIN | X | | | | | | | |
| Delete Manager PIN | X | | | | | | | |
| Add User PIN | X | X | | | | | | |
| Delete User PIN | X | X | | | | | | |
| Add Vendor PIN | X | X | | | | | | |
| Delete Vendor PIN | X | X | | | | | | |
| Set Time | X | X | | | | | | |
| Enroll Transmitter | X | | | | | | | |
| Enroll DWS | X | | | | | | | |
| Enable Keypad Only | X | | | | | | | |
| Set User Access Hours | X | X | | | | | | |
| Set Vendor Access Hours | X | X | | | | | | |
| Add General Vendor PIN | X | X | | | | | | |
| Delete General Vendor PIN | X | X | | | | | | |
| Add Limited Time PIN | X | X | | | | | | |
| Delete Limited Time PIN | X | X | | | | | | |
| Add One Time PIN | X | X | | | | | | |
| Delete One Time PIN | X | X | | | | | | |
| Add Open Now PIN | X | X | | | | | | |
| Open Now | | | | | | | | X |
| Access Key | X | X | X | X | X | X | X | |
| Access Key Enable Alarm | X | X | X | X | X | X | X | |
| Access Key Disable Alarm | X | X | X | X | X | X | X | |
| Enable Alarm | X | X | X | X | X | X | X | |
| Disable Alarm | X | X | X | X | X | X | X | |
| Accessory On | X | X | X | X | X | X | X | |
| Accessory Off | X | X | X | X | X | X | X | |

-continued

|  | | | | | | | | |
|---|---|---|---|---|---|---|---|---|
| * (power up) | X | X | X | X | X | X | X | |
| *11 (power up for OPEN NOW) | | | | | | | | X |
| View Date Activity | X | X | | | | | | |
| View PIN Activity | X | X | | | | | | |
| Review PIN | X | X | | | | | | |
| Low Battery | X | X | X | X | X | X | X | X |
| Incorrect PIN | X | X | X | X | X | X | X | X |
| Login Attempts Exceeded | X | X | X | X | X | X | X | X |
| # PINS Exceeded | X | X | X | X | X | X | X | X |
| Record Access | X | X | X | X | X | X | X | X |
| Record Incorrect Code Entry | X | X | X | X | X | X | X | X |
| Reset Clock (auto correction) | | | | | | | | |
| Read Clock | | | | | | | | |

The RF modules that may communicate with the security panels may utilize the built-in RF protocols that exist for security key fobs. The protocol may not make provisions for sending a low battery alarm in the event the battery on the key fob falls below a threshold voltage level. Since it may be desired to obtain "low battery" functionality, a dummy Door Window Sensor (DWS) device, which does have the low battery functionality, may be enrolled. During installation, a dealer may first enroll the transmitter, then the DWS device.

2.11. Enable Keypad Only

For SP-Security and SP-Net installations, an additional SETUP command may be available to ADMIN and MANAGER users, which may allow the ENABLE ALARM and DISABLE ALARM commands to be utilized.

2.12. Set User Access Hours

May be available to ADMIN and MANAGER users to limit Keysafe access for two-way (SPNet) customers. An ADMIN or MANAGER may program a lockout period on the Web Portal. The lockout period may apply to all users except ADMIN or MANAGER types.

There may be two options:
a. 24 HR ACCESS
b. ACCESS HOURS
  i. BEGINNING HR:MIN
  ii. ENDING HR:MIN 2.13. Set Vendor Access Hours May be available to ADMIN and MANAGER users to limit Keysafe access for two-way (SPNet) customers. An ADMIN or MANAGER may program a lockout period on the Web Portal. The lockout period may apply to all VENDORs.

There may be two options:
a. 24 HR ACCESS
b. ACCESS HOURS
  i. BEGINNING HR:MIN
  ii. ENDING HR:MIN 2.14. Add General Vendor PIN This may be a PIN code that may be generated by the SP-Net ADMIN or MANAGER level users. It may be recognized by the Keysafe as a valid PIN and the Web Portal may use a relational database to make it equivalent for multiple sites.

2.15. Delete General Vendor PIN 2.16. Add Limited Time PIN

SP-WEB, SP-SECURITY Systems may have a web portal application create a TIME CODE that may contain the date that the ONE TIME PIN was valid or the starting date, starting time and ending date the LIMITED TIME PIN was valid. This may allow non-wireless systems to be used by users such as vacation rental agencies. For example, a rental property manager could get on the website, generate a PIN, and record both it and the corresponding TIME CODE. He may in turn give the PIN to a vacationer who may enter the PIN at the box. The box may respond by asking for the TIME CODE, it may then decrypt the code and internally make that PIN good for the prescribed amount of time.

SP-NET Systems may already know what level of service the Keysafe is. If a SP-NET level, it may look for a second data string that, nay be sent whenever a ONE TIME or LIMITED TIME code was created on the web portal. This may eliminate the need for the manager to write down an additional TIMECODE or the need for an end user to input it.

2.17. Delete Limited Time PIN 2.18. Add One Time PIN

A single time access code may be generated that may allow a user access to a keypouch just one time on a particular day. This may require a second packet to be sent for SP-NET level customers or a second TIME CODE to be entered that conveys a day for SP-ACCESS, SP-WEB and SP-SECURITY level customers. The second piece of information may be a packet containing the day of the year when the code is valid.

2.19. Delete One Time PIN 2.20. Add Open Now PIN

This command may allow a SP-NET system Admin or Manager to create a valid PIN that may be communicated via phone, email, or web phone application to someone needing immediate entry to a Keysafe.

2.21. Open Now

The user may enter a code such as *,1,1 to wake up the device where it may prompt for a correct "Open Now" PIN code.

2.22. Access Key

Successful Key Pouch openings may result in the generation of a data packet to be sent to the Gateway substantially immediately after the event. This data packet may contain information such as: KEY SEQUENCE: *,PIN, <OK>

2.23. Access Key Enable Alarm

Successful Key Pouch openings may result in the generation of a data packet to be sent to the Gateway substantially immediately" after the event. This data packet may contain information such as: KEY SEQUENCE: *,PIN,#, <OK>

2.24. Access Key Disable Alarm

Successful Key Pouch openings may result in the generation of a data packet to be sent to the Gateway substantially immediately after the event. This data packet may contain information such as: KEY SEQUENCE: *,PIN,*, <OK>

2.25. Enable Alarm

A user may be able to utilize the SP-Keysafe as a remote keypad to enable the alarm without dropping the keypouch. A successful activation may result in the generation of a data packet to be sent to the Gateway substantially immediately after the event. This data packet may contain information such as: KEY SEQUENCE: *,PIN,#,#, <OK>

2.26. Disable Alarm

A user may be able to utilize the Keysafe as a remote keypad to enable the alarm without dropping the keypouch. A successful de-activation may result in the generation of a data packet to be sent to the Gateway substantially immediately after the event. This data packet may contain information such as: KEY SEQUENCE: *,PIN,*,*, <OK>

2.27. Accessory On

The keypad may be able to turn on accessories such as magnetic key locks. KEY SEQUENCE: ?????? <OK>

2.28. Accessory Off

The keypad may be able to turn off accessories such as magnetic key locks KEY SEQUENCE: ?????? <OK>

2.29. *(Power Up)

A user may generally wake up a device by pushing a button such as the "*" button, which may bring the Keysafe out of hibernation mode.

2.30. *11(Power Up for Open Now)

A user may wake up a device by pushing a sequence of buttons, for example the "*" then "1" and "1" buttons, which may bring the Keysafe out of hibernation mode and may cause it to await an "Open Now" valid PIN code.

2.31. View Date Activity 2.32. View PIN Activity 2.33. Review PIN 2.34. Low Battery If the battery voltage drops below a certain predetermined voltage, a message may be sent to the Gateway, for example during an "Initialize System" phase.

2.35. Incorrect PIN 2.36. Login Attempts Exceeded

If a user attempts to log in with an invalid PIN code a predetermined number of times within a predetermined amount of time, for example three times within a five minute period, a message may be sent via the Gateway. This may be a valuable notification, for example in case of a vendor being unable to access a door, or a disgruntled employee trying to gain unauthorized access.

2.37. # PINS Exceeded 2.38. Record Access 2.39. Record Incorrect Code Entry 2.40. Reset Clock 2.41. Read Clock Second Example Command Matrix The second example command matrix shows whether the commands are available with the basic Keysafe, Code Creator or Web Connect Service options. The second matrix also shows under which menus on the PointSafe or Web Portal certain commands exist. Various users have permission for certain commands also. The maximum number of bits required for each command is also shown. From a complexity and communications robustness perspective, it may be desirable to limit each command to a single data transmission. Regulatory rules may require each transmission to be less than a certain length of bits. Sixty-four commands may be used in accordance with wireless protocols.

| | | Hardward Level | | | Keysafe Menu | | | System | Web Portal | |
|---|---|---|---|---|---|---|---|---|---|---|
| RFCommand | Command | Point-Safe | PointSafe-RF | Point-Gateway | Program | Access | History | Generated | Program | History |
| 1 | Supervisory | | X | X | | | | X | | |
| 2 | Add Admin PIN | X | X | X | | | | | X | |
| 3 | Add Manager PIN | X | X | X | | | | | X | |
| 4 | Delete Manager PIN | X | X | X | X | | | | X | |
| 5 | Add User PIN | X | X | X | | | | | X | |
| 6 | Delete User PIN | X | X | X | X | | | | X | |
| 7 | Add Vendor Employee PIN | | | X | | | | | X | |
| 8 | Delete Vendor Employee PIN | | | X | X | | | | X | |
| 9 | Set Time | X | X | X | X | | | X | X | |
| 10 | Enroll Transmitter | | X | X | X | | | | | |
| 11 | Enroll DWS | | X | X | X | | | | | |
| 12 | Enable Keypad Only | | | X | | | | | X | |
| 13 | Set User Access Hours | | | X | | | | | X | |
| 14 | Set vendor Access Hours | | | X | | | | | X | |
| 15 | Add Authorized Vendor | | | X | | | | | X | |
| 16 | Del Authorized Vendor | | | X | | | | | X | |
| 17 | Add Limited Time PIN | X | X | X | | | | | X | |
| 18 | Delete Limited Time PIN | X | X | X | X | | | | X | |
| 19 | Add One Time PIN | X | X | X | | | | | X | |
| 20 | Delete One Time PIN | X | X | X | X | | | | X | |
| 21 | Open Now | | | X | | | | | X | |
| 22 | Access Key | X | | | | X | | | | |
| 23 | Access Key Enable Alarm | | X | X | | X | | | | |
| 24 | Access Key Disable Alarm | | X | X | | X | | | | |
| 25 | Enable Alarm | | X | X | | X | | | | |
| 26 | Disable Alarm | | X | X | | X | | | | |
| 27 | Closing Code | | | X | | | | | | |
| 28 | Accessory On | | | X | | | | | | |
| 29 | Accessory Off | | | X | | | | | | |
| 30 | * (power up) | X | X | X | | X | | | | |
| 31 | *11 (power up for OPEN NOW) | | | X | | X | | | | |

-continued

| RFCommand | Command | Admin | Manager | User | Vendor Employee | One Time User | Limited Time User | Open Now | Authorized Vendor |
|---|---|---|---|---|---|---|---|---|---|
| 32 | View Date Activity | X | X | X |  | X |  |  | X |
| 33 | View PIN Activity | X | X | X |  | X |  |  | X |
| 34 | Alarm Status |  | X | X |  |  | X |  |  |
| 35 | Incorrect PIN | X | X | X |  |  | X |  |  |
| 36 | Login Attempts Exceeded |  |  |  |  |  | X |  |  |
| 37 | Factory Reset | X | X | X | X |  |  | X |  |
| 38 | Display Serial Number | X | X | X |  |  |  |  |  |
| 39 | Set Date | X | X | X |  |  |  |  |  |
| 40 | Get Date |  |  | X |  |  |  |  |  |
| 41 | Get Time |  |  | X |  |  | X |  |  |
| 42 | COMM DELETED Refresh PINs |  |  |  |  |  |  |  |  |
| 43 | Time Code Start | X | X | X | X |  |  | X |  |
| 44 | Time Code End | X | X | X | X |  |  | X |  |
| 45 | Acknowledge |  |  |  |  |  |  |  |  |
| 46 | Delete Admin PIN | X | X | X |  |  |  | X |  |

| | | User Type Command is Available To | | | | | | | |
|---|---|---|---|---|---|---|---|---|---|
| RFCommand | Command | Admin | Manager | User | Vendor Employee | One Time User | Limited Time User | Open Now | Authorized Vendor |
| 1 | Supervisory |  |  |  |  |  |  |  |  |
| 2 | Add Admin PIN | X |  |  |  |  |  |  |  |
| 3 | Add Manager PIN | X |  |  |  |  |  |  |  |
| 4 | Delete Manager PIN | X |  |  |  |  |  |  |  |
| 5 | Add User PIN | X | X |  |  |  |  |  |  |
| 6 | Delete User PIN | X | X |  |  |  |  |  |  |
| 7 | Add Vendor Employee PIN | X | X |  |  |  |  |  | X |
| 8 | Delete Vendor Employee PIN | X | X |  |  |  |  |  | X |
| 9 | Set Time | X | X |  |  |  |  |  |  |
| 10 | Enroll Transmitter | X |  |  |  |  |  |  |  |
| 11 | Enroll DWS | X |  |  |  |  |  |  |  |
| 12 | Enable Keypad Only | X |  |  |  |  |  |  |  |
| 13 | Set User Access Hours | X | X |  |  |  |  |  |  |
| 14 | Set vendor Access Hours | X | X |  |  |  |  |  | X |
| 15 | Add Authorized Vendor | X | X |  |  |  |  |  |  |
| 16 | Del Authorized Vendor | X | X |  |  |  |  |  |  |
| 17 | Add Limited Time PIN | X | X |  |  |  |  |  |  |
| 18 | Delete Limited Time PIN | X | X |  |  |  |  |  |  |
| 19 | Add One Time PIN | X | X |  |  |  |  |  |  |
| 20 | Delete One Time PIN | X | X |  |  |  |  |  |  |
| 21 | Open Now |  |  |  |  |  |  | X |  |
| 22 | Access Key | X | X | X | X | X | X |  |  |
| 23 | Access Key Enable Alarm | X | X | X | X | X | X |  |  |
| 24 | Access Key Disable Alarm | X | X | X | X | X | X |  |  |
| 25 | Enable Alarm | X | X | X | X | X | X |  |  |
| 26 | Disable Alarm | X | X | X | X | X | X |  |  |
| 27 | Closing Code |  |  |  |  |  |  |  |  |
| 28 | Accessory On |  |  |  |  |  |  |  |  |
| 29 | Accessory Off |  |  |  |  |  |  |  |  |
| 30 | * (power up) | X | X | X | X | X | X |  |  |
| 31 | *11 (power up for OPEN NOW) |  |  |  |  |  |  | X |  |
| 32 | View Date Activity | X | X |  |  |  |  |  |  |
| 33 | View PIN Activity | X | X |  |  |  |  |  |  |
| 34 | Alarm Status | X | X | X | X | X | X | X |  |
| 35 | Incorrect PIN | X | X | X | X | X | X | X |  |
| 36 | Login Attempts Exceeded | X | X | X | X | X | X | X |  |
| 37 | Factory Reset | X |  |  |  |  |  |  |  |
| 38 | Display Serial Number |  |  |  |  |  |  |  |  |
| 39 | Set Date |  |  |  |  |  |  |  |  |
| 40 | Get Date |  |  |  |  |  |  |  |  |
| 41 | Get Time |  |  |  |  |  |  |  |  |
| 42 | COMM DELETED Refresh PINs |  |  |  |  |  |  |  |  |
| 43 | Time Code Start | X |  |  |  |  |  |  |  |
| 44 | Time Code End | X |  |  |  |  |  |  |  |
| 45 | Acknowledge |  |  |  |  |  |  |  |  |
| 46 | Delete Admin PIN | X |  |  |  |  |  |  |  |

3.1. Supervisory

Both PointSafe-RF and PointGateway systems may require a SUPERVISORY command that monitors the status of the PointSafe data, battery status and determines if there are any commands waiting to be pushed down to the PointSafe from the web portal. A single bit of information monitors the PointSafe battery (good or bad), a "checksum" sequence ensures the data in the PointSafe is not corrupted.

The PointSafe may wake itself up once per hour and transmit the SUPERVISORY command to the Gateway. If the Gateway has information waiting to be downloaded, it transmits the commands within the 30 second "listening" period that the PointSafe is awake.

3.2. Change Admin PIN

In some examples, this can only be done via the web portal. A new customer may be required to go to the web portal and register before he receives the initial Admin PIN number. A Registration Code may be included in a tamper proof envelope with every PointSafe. This may be required during the initial registration process on the web portal to ensure that a dealer or locksmith has not learned of valid PIN codes before selling to an end customer.

3.3. Add Manager PIN

In some examples, this can only be done via the web portal.

3.4. Delete Manager PIN

These may be deleted at the PointSafe or via the web portal.

3.5. Add User PIN

In some examples, this can only be done via the web portal. For PointConnect systems the PIN numbers may be generated on the web portal and "pushed" to the PointSafe. The PointSafe may store the array of pushed PIN's in a separate location from the pre-programmed PIN's programmed at the factory.

3.6. Delete User PIN

These may be deleted at the PointSafe or via the web portal. For standalone systems, PIN's need to be deleted at the PointSafe.

3.7. Add Vendor Employee PIN

In some examples, this is a PIN code that can be generated by the Admin or Manager level users or by an Authorized Vendor only on the web portal. It may be recognized by the PointSafe as a valid PIN and the web portal may use the relational database to make it equivalent for multiple sites. These PIN numbers are not pre-programmed into the devices and therefore cannot be used with non Two-Way communication PointSafes. These PIN numbers may be "pushed" to the PointSafes via the Two-Way wireless and Gateway.

The owner/administrator may have the option on the web portal to allow or disallow authorized vendors from generating vendor employee codes themselves. If disallowed, the owner/administrator generates and distributes the codes personally.

3.8. Delete Vendor Employee PIN

These can be deleted at the PointSafe or via the web portal. If done at the PointSafe with RF capabilities, the transaction may be relayed to the Gateway to update the relational database on the web portal.

3.9. Set Time

This can be done at the device or via the web portal manually by administrators or automatically for Two-Way systems.

3.10. Enroll Transmitter

In some examples, this command and functionality is only available for PointSafe-RF devices. In these examples, the enrollment must be done at the device and the PointSafe transmitter must be enrolled on the panel as a keyfob device to utilize the keyfob communications.

3.10.1. Command Disabled Flag

The enrollment process also may trigger an internal flag to be set in the PointSafe which turns off the "Access Key" command. This internal flag may be referred to as the COMMAND DISABLED flag and can be set to YES or NO.

As part of the setup process, an installer may need to configure the panel to utilize the "programmable output" option which sends a signal to the Gateway unit via a hardwired set of leads.

3.11. Enroll DWS

In some examples, this command and functionality is only available for PointSafe RF devices. The RF modules that communicate with security panels may utilize the built in RF protocols that exist for security keyfobs. The protocol does not make provisions for sending a low battery alarm in the event that the battery on the keyfob falls below a threshold voltage level. This may be because if a keyfob fails to work a user instinctively replaces the battery to see if this fixes it. To use the LOW BATTERY command functionality, we also may "enroll" a dummy Door Window Sensor (DWS) device which does have the LOW BATTERY functionality. During installation, a dealer may first enroll the transmitter then the DWS device. Different panels may have different mechanisms of displaying LOW BATTERY conditions for DWS devices including LCD and LED display.

3.12. Enable Keypad Only

For PointSafe RF or PointGateway installations an additional SETUP command may be available to ADMIN and MANAGER users to allow the ENABLE ALARM and DISABLE ALARM commands to be utilized.

3.12.1. Keypad Only Flag

If activated in SETUP, the KEYPAD ONLY FLAG will be set to ON.

3.13. Set User Access Hours

Available to ADMIN and MANAGER type users to limit PointSafe access for Two-Way customers. An ADMIN or MANAGER can program on the Web Portal a lockout period. The lockout period would apply to all users except for ADMIN or VENDOR types.

There may be 2 options:
 a. 24 HR ACCESS
 b. ACCESS HOURS
  i. BEGINNING HR:MIN
  ii. ENDING HR:MIN 3.14. Set Vendor Employee Access Hours Available to ADMIN and MANAGER type users to limit PointSafe access for Vendor Employees. An ADMIN or MANAGER can program on the Web Portal a lockout period. The lockout period would apply to all VENDOR Employees.

There will be 2 options:
 a. 24 HR ACCESS
 b. ACCESS HOURS
  i. BEGINNING HR:MIN
  ii. ENDING HR:MIN 3.15. Add Authorized Vendor (List)

A list of authorized vendors may be kept on the web portal. Each vendor may be assigned a unique number represented by 16 bits. An Admin or Manager can add an authorized vendor to his list for particular PointSafes. This will allow for 65,000 unique vendors across the country. Via the Authorized Vendor portal an authorized vendor can create unique Vendor Employee PIN numbers to be used to access multiple PointSafes, if the owner/administrator gives them the ability, else the owner/administrator generates and distributes PINs. In some implementations, no list of Authorized Vendors will be kept on the PointSafe itself.

3.16. Delete Authorized Vendor

In some examples, authorized vendors can only be added and deleted via the web portal. Once this occurs successive DELETE VENDOR EMPLOYEE commands are issued to delete all employees of the deleted vendor.

3.17. Add Limited Time PIN

In some examples, this can only be done via the web portal.

PointSafe, PointSafe-RF Systems—The web portal application may create an 11 Digit TIME CODE that contains the date the ONE TIME PIN is valid or the starting date, starting time and duration of days the LIMITED TIME PIN was valid. This may allow non-wireless systems to be used by vacation rental agencies. The rental property manager can get on the website, generate a PIN and record both it and the corresponding TIME CODE. He'll in turn give it to the vacationer who will enter the PIN at the PointSafe. The PointSafe will respond by asking for the TIME CODE, it will decrypt the code and internally make that PIN good for the prescribed amount of time.

PointGateway Systems—Both the PIN and TIME CODE are "pushed" down to Two-Way systems eliminating the need for a ONE TIME or LIMITED TIME user from having to input the TIME CODE when they access a PointSafe.

3.18. Delete Limited Time PIN

These can be deleted at the PointSafe or via the web portal.

3.19. Add One Time PIN

A single time access code can be generated that allows someone access to a keypouch for just one time if a non-panel installation. If it is a system that has been enrolled with a panel, a second ACCESS KEY DISABLE ALARM command may be allowed.

3.20. Delete One Time PIN

These can be deleted at the PointSafe or via the web portal.

3.21. Open Now

PointGateway level Administrators and Managers may have the ability to send an "OPEN NOW" command to a PointSafe from either the web portal or eventually a phone application. Once a manager has established that someone is physically at the device a command can be sent to allow the user to enter *,1,1,<OK> to wake up the device and have it send a query to the web portal to verify a valid OPEN NOW command has been sent. The web portal or phone application may need to explicitly show the administrator/manager the "*,1,1,<OK>" keys he needs to instruct the person on the other end to type in.

A verification message may be transmitted back to the listening PointSafe which will then display OPEN NOW on the screen and allow the user to rotate the knob to drop the keypouch. The OPEN NOW command may generate a record in the HISTORY file of what time the command was transmitted and the PIN of requestor.

3.22. Access Key

Successful PIN numbers entered on the keypad may result in the generation of a data packet to be sent to the Gateway immediately after the event. If for any reason someone entered a valid sequence to open the keypouch, and then held the knob in a position where the blocking mechanism prevented the solenoid from returning to a locked position, the firmware may "pulse" the solenoid fifteen seconds later to again attempt to relock the PointSafe. If someone held the knob open for longer than this period, the PointSafe may remain in an open position where the knob could be turned and drop the keypouch. This safety timing may be required for any access or remote keypad command including those for ancillary devices. KEY SEQUENCE: *,PIN, <OK>

If a user attempts to drop the keypouch via the Access Key sequence when the "Command Disabled" flag is set, the "COMMAND BLOCKED" error message may appear in the LCD screen along with the LED error event display (3 LONG RED FLASHES 1 SEC EACH).

3.23. Access Key Enable Alarm

Successful Key Pouch opening may result in the generation of a data packet to be sent to the Gateway immediately after the event KEY SEQUENCE: *,PIN,#, <OK> The display may read ALARM ON.

3.24. Access Key Disable Alarm

After the command is sent, but before the solenoid is energized to allow the Key Pouch to be dropped, an "ALARM STATUS" query may be sent to the Gateway. The Gateway may in turn report back if it is "enabled" or "disabled." If the command successfully disabled the alarm, the pouch will drop. If for any reason the panel is not in a disabled state, a COMMAND BLOCKED message may be displayed and the solenoid may not release the keypouch.

Successful Key Pouch openings may result in the generation of a data packet to be sent to the Gateway immediately after the event KEY SEQUENCE: *,PIN,*, <OK> The display may read ALARM OFF.

3.25. Enable Alarm

A user may be able to utilize the PointSafe as a remote keypad to enable the alarm without dropping the keypouch. A successful activation may result in the generation of a data packet to be sent to the Gateway immediately after the event KEY SEQUENCE: *,PIN,#,#, <OK>

3.26. Disable Alarm

A user may be able to utilize the PointSafe as a remote keypad to enable the alarm without dropping the keypouch. A successful de-activation may result in the generation of a data packet to be sent to the Gateway immediately after the event KEY SEQUENCE: *,PIN,*,*, <OK>

3.27. Closing Code

For double keyed installations, the owners may want to know when keys are returned to the PointSafe. Owners may train their managers to use this feature when returning a key. Although they will return the keypouch with a slam latch, they may want to have them right afterwards enter the sequence below to identify it is simply a return operation. This may result in the generation of a data packet to be sent to the Gateway immediately after the event KEY SEQUENCE: *,PIN,*,#, <OK>

3.28. Accessory On

The keypad may be able to turn on accessories such as magnetic key locks KEY SEQUENCE: *,PIN,> <OK>

3.29. Accessory Off

The keypad may be able to turn off accessories such as magnetic key locks KEY SEQUENCE: *,PIN,< <OK>

3.30. *(Power Up)

A user may generally wake up a device by pushing the * button which brings the PointSafe out of hibernation mode.

3.31. *11(Power Up for Open Now)

A user may wake up a device by pushing the * then 1 and 1 buttons which brings the PointSafe out of hibernation mode and looking for an "Open Now" valide PIN code.

3.32. View Date Activity

Sixty days of event history may be available for viewing at the PointSafe or Web Portal for Two-Way systems.

3.33. View PIN Activity

Sixty days of event history may be available for viewing the PointSafe or Web Portal for Two-Way systems.

3.34. Alarm Status

After the alarm panel has been programmed to utilize the output function, it may have the ability to send a signal to the Gateway that indicates whether the panel is armed or disarmed.

3.35. Incorrect PIN

If an incorrect PIN is entered or a sequence of keys is entered, the device may shutoff and increment the incorrect PIN counter.

3.36. Login Attempts Exceeded

If a user attempts to login with an invalid PIN code three times within a five minute period, a message may be sent via the Gateway. The device also may enter a hibernation mode for five minutes to deter someone who is attempting unauthorized access. This may be a valuable notification in case of a vendor not being able to access a door or a disgruntled employee trying to gain access.

3.37. Factory Reset (Code)

To ensure that the relational database coincides with standalone devices, Administrators wishing to reset their PointSafe to factory new may be forced to go to the website. At the website, they may be asked if they wish to restore their PointSafe and then give a Factory Reset Code of 11 digits. The setup menu may have a Factory Reset option which, if selected, may restore the PointSafe to Year One condition.

3.38. Display Serial Number

Enables Administrators to verify the device serial number in case the label is missing our unreadable.

3.39. Set Date

W=Day of Week (1-7), Date=Day of Month (1-31), M=Month (1-12), Y=Year (0-99)

3.40. Get Date

Enables Administrators to validate that the PointSafe has the correct date.

3.41. Get Time

Enables Administrators to validate that the PointSafe has the correct time.

3.42. (Command Deleted) Refresh PINs

Enables Administrators to erase all of the pre-populated PIN numbers via an XOR or similar binary operation to shift all of the PIN numbers values.

3.43. Time Code Start

This is the start time and date that either a LIMITED TIME or ONE TIME PIN code is valid for.

3.44. Time Code End

This is the end time and date that either a LIMITED TIME or ONE TIME PIN code is valid for.

3.45. Acknowledge

In some examples, this message provides an acknowledgement that a remote command has been received and/or that the corresponding operation has been performed.

3.46. Delete Admin PIN

Deletes the PIN set for an administrator.

4. Design Specifications 4.1. RF Communications 4.2. Keysafe 4.2.1. Mechanical Requirements The device may be mounted on standard door frames, for example on standard two-inch retail glass storefront doorframes.

4.2.1.1. Enclosure

The enclosure may be more difficult to get into and remove the key than it would be to break the door to gain entry. The Serial number may be printed on the front of the device.

4.2.1.2. LCD Display

The LCD may be visible in bright, light but may not have backlighting. The display may be able to show two lines of eight characters each. The display may be monochromatic.

4.2.1.3. Keypad

The Keypad may have a standard layout 10-key pad with # and * keys. In addition, suitable keys such as "OK", "up-arrow" and "down-arrow" keys may be included to toggle between commands and acknowledge inputs. The keypad may be remotely connected to the main PCB and mounted on the exterior of the Keysafe. Tampering or removal of the keypad may result in a failsafe condition in which the key pouch cannot be opened.

4.2.1.4. Cover

The cover may be made from an elastomeric material that may have an integral hinge and provisions for mounting in a suitable location, for example under the Keysafe.

4.2.1.5. External Power Port

In the event of battery failure, the device may have a "power port" where the user may attach a "Battery Jumper". The Battery Jumper, in conjunction with the "device master code" and PIN being manually entered via the Keysafe keypad, may allow the device to be externally powered in situations such as emergency and/or battery failure situations.

4.2.1.6. Battery

For example, a battery may be a lithium ion 123A size battery maximum, for a three year target life of approximately 7,500 to 20,000 locking cycles.

4.2.1.7. RF Antenna/Transceiver Module

One or more antennas may each be configured in a single physical configuration. Firmware may be used to enable one-way or two-way mode of operation. An RF Transceiver PCB and antennas may be housed in a separate plastic enclosure located at the top of the Keysafe assembly.

4.2.2. Electrical Requirements 4.2.2.1. Key Pouch

The key pouch may be able to hold up to two keys simultaneously. The primary key may be tethered to the pouch via a suitable connection, such as a plastic tie wrap or a two-inch, braided, wire leash that may be supplied and applied by the dealer/installer. The braided leash may be crimped by the installer to prevent it from being easily removed from the key pouch. Key sizes up to, for example, a maximum of 2.25"×1.125"×0.090" may be accommodated. Once the PIN code is entered, the key pouch may be free to be removed by hand. It may be desired to not allow the pouch to freely drop to the ground to prevent breakage or loss of keys. The pouch may be able to be returned to the Keysafe without needing to re-enter the code, for example, utilizing a "slam-latch" locking design.

4.2.2.2, Microprocessor

For example, non-volatile memory with universal asynchronous receiver/transmitter (UART) capability.

4.2.2.3. Internal Clock

May have capability to reset manually for standalone version and one-way transmitter mode. May have automatic update for two-way transceiver mode, which may have connectivity to a Web Portal clock.

4.2.2.4. External Power Jack

May protect circuit against electrical attack, failsafe provisions, and/or may allow reverse hookup.

4.2.2.5. LCD

For example, two lines of eight characters each, which may be operational within, for example, 0-50 deg C.

4.2.2.6. Transmitter/Transceiver Provisions

A constant voltage, for example 3.1V, may be supplied by the Keysafe to the transmitter/transceiver.

4.2.3. Firmware 4.2.3.1. Master or Registration Code

In some examples, the Keysafe may come pre-programmed with, for example, an 8 digit "device master code".

The user may be required to register the device online, where he may be given the code to write down and protect similar to his PIN number. The Master Code may be required the first time the ADMIN sets up a device, for example directly via the LCD or on the website.

In some implementations, the Keysafe comes pre-programmed with a 7 digit "Registration code". The user may be required to register the device on line where he will then be given an ADMIN user code for subsequent setup and administration. The REGISTRATION CODE may be required the first time the ADMIN person registers a device via the web portal. The Registration code may be the first number generated by the manufacturing computer program. It may utilize 7 digits instead of the 6 used for PIN numbers.

4.2.3.2. SP-Serial Number

Each Keysafe may come from the factory with, for example, an electronically embedded seven-digit "serial number" that may be printed both on the front of the device and the installation manual. These serial numbers may be generated "randomly" to prevent sequential numbering that might result in the PIN code generation algorithm creating PIN codes that might work on geographically nearby installations.

4.2.3.3. PIN Codes

In some implementations, to achieve generation of PIN codes, for example either at the box or via the Web application without any communication between them, a pseudorandom number generator may be implemented in both the Keysafe and the server on which customer data may be stored. Using the serial number of the device as the "seed" or start value may allow PIN numbers to be generated either place that may be validated by the Keysafe.

The unique seed value also may ensure that no two Keysafes will leave the factory with identical PIN numbers. A linear congruential generator (LCG) may be employed, as LCGs are fast and require minimal memory to retain state especially if only a small number of the high order bits are used.

The generator may be defined by the recurrence relation:

$$X_{n+1} = (aX_n + c) \bmod m$$

where $X_n$ is the sequence of pseudorandom values, and
m, 0<m the "modulus"
a, 0<a<m the "multiplier"
c, 0≤c<m the "increment"
$X_0$, 0≤$X_0$<m the "seed" or "start value" (for example, the serial number)
are integer constants that specify the generator.

Predetermined constants for m, a, and c may be initially used. The values may be considered highly classified information and protected accordingly. Business or development concerns may make it necessary to change them periodically and therefore hidden data cells on the server may be provided to ensure older products in the field may continue to have valid PIN codes generated remotely.

During the product registration process the Keysafe may be turned on, which may trigger the algorithm to generate, for example, two arrays of PIN Codes, the KEYSAFE PIN codes and the WEB PORTAL KEYSAFE PIN codes. The size of the array may be a function of memory available on the microprocessor.

In some examples, six digit PIN codes for all Keysafes may be created by a random number generator on the manufacturing computer. Approximately ten years' worth of PIN's may be programmed into the Keysafe memory each different from other Keysafe's. Keysafe-RF systems that have PointConnect may have the ability to have their PIN numbers "pushed" down to the Keysafe's via wireless commands. These PIN's may occupy different data registers than the pre-programmed ones. This may ensure that Keysafes that are upgraded will not lose the previously allocated PIN numbers and not disrupt users.

The advantage to the wireless method is that PIN numbers may be chosen and not randomly assigned (providing the number has not been already used).

For non-PointConnect systems the pre-programmed PIN numbers may be unavailable until a system has completed successful registration and some PIN numbers have been checked out via the web portal and entered in via the Keysafe keypad. To ensure that only a minimum of valid numbers are active at a time, the following scenario may be utilized which is shown via the table example below:

1. The Keysafe is pre-programmed with 9,000 valid PIN numbers (41 shown in example), only 30 of which are ACTIVE.
2. An administrator or manager checks out 4 PIN numbers and gives them to employees.
3. The employee given the 3rd PIN number uses it on Thursday
    a. Since his PIN was in the 3rd data register and we want to keep a buffer of 30 Valid PIN codes ahead of him this triggers the Keysafe to activate 3 more PIN numbers
4. This same employee and another with a PIN number in data register 1 uses it the next day
    a. Since neither PIN was in a higher data register no additional PIN's are made ACTIVE
5. On Saturday another employee uses the PIN code that is mapped to the 4th data register
    a. Since his PIN was in the 4th data register and we want to keep a buffer of 30 Valid PIN codes ahead of him this triggers the Keysafe to activate 1 more PIN number

| User PIN Data Register | User PIN | Mon Before Registration Completed | Tue Registration Completed | Wed PIN's Checked Out By MANAGER | Thu PIN Used at PointSafe | Fri PIN Used at PointSafe | Sat PIN's Used at PointSafe |
|---|---|---|---|---|---|---|---|
| 1 | 123456 | INACTIVE | | | | ** | |
| 2 | 123457 | INACTIVE | | | | | |
| 3 | 123458 | INACTIVE | | | * | | |
| 4 | 123459 | INACTIVE | | | | | *** |
| 5 | 123460 | INACTIVE | | | | | |
| 6 | 123461 | INACTIVE | | | | | |
| 7 | 123462 | INACTIVE | | | | | |
| 8 | 123463 | INACTIVE | | | | | |
| 9 | 123464 | INACTIVE | | | | | |

-continued

| User PIN Data Register | User PIN | Mon Before Registration Completed | Tue Registration Completed | Wed PIN's Checked Out By MANAGER | Thu PIN Used at PointSafe | Fri PIN Used at PointSafe | Sat PIN's Used at PointSafe | |
|---|---|---|---|---|---|---|---|---|
| 10 | 123465 | INACTIVE | | | | | | |
| 11 | 123466 | INACTIVE | | | | | | |
| 12 | 123467 | INACTIVE | | | | | | |
| 13 | 123468 | INACTIVE | | | | | | |
| 14 | 123469 | INACTIVE | | | | | | |
| 15 | 123470 | INACTIVE | | | | | | |
| 16 | 123471 | INACTIVE | | | | | | |
| 17 | 123472 | INACTIVE | | | | | | |
| 18 | 123473 | INACTIVE | | | | | | This color means INACTIVE |
| 19 | 123474 | INACTIVE | | | | | | |
| 20 | 123475 | INACTIVE | | | | | | |
| 21 | 123476 | INACTIVE | | | | | | |
| 22 | 123477 | INACTIVE | | | | | | |
| 23 | 123478 | INACTIVE | | | | | | This color means ACTIVE |
| 24 | 123479 | INACTIVE | | | | | | |
| 25 | 123480 | INACTIVE | | | | | | |
| 26 | 123481 | INACTIVE | | | | | | |
| 27 | 123482 | INACTIVE | | | | | | This color indicates the PIN was used that day |
| 28 | 123483 | INACTIVE | | | | | | |
| 29 | 123484 | INACTIVE | | | | | | |
| 30 | 123485 | INACTIVE | | | | | | |
| 31 | 123486 | INACTIVE | INACTIVE | INACTIVE | | | | |
| 32 | 123487 | INACTIVE | INACTIVE | INACTIVE | | | | This color indicates the PIN was checked out from the web portal that day |
| 33 | 123488 | INACTIVE | INACTIVE | INACTIVE | | | | |
| 34 | 123489 | INACTIVE | INACTIVE | INACTIVE | INACTIVE | INACTIVE | | |
| 35 | 123490 | INACTIVE | INACTIVE | INACTIVE | INACTIVE | INACTIVE | INACTIVE | |
| 36 | 123491 | INACTIVE | INACTIVE | INACTIVE | INACTIVE | INACTIVE | INACTIVE | |
| 37 | 123492 | INACTIVE | INACTIVE | INACTIVE | INACTIVE | INACTIVE | INACTIVE | |
| 38 | 123493 | INACTIVE | INACTIVE | INACTIVE | INACTIVE | INACTIVE | INACTIVE | |
| 39 | 123494 | INACTIVE | INACTIVE | INACTIVE | INACTIVE | INACTIVE | INACTIVE | |
| 40 | 123495 | INACTIVE | INACTIVE | INACTIVE | INACTIVE | INACTIVE | INACTIVE | |
| 41 | 123496 | INACTIVE | INACTIVE | INACTIVE | INACTIVE | INACTIVE | INACTIVE | |

*This causes 3 additional PIN numbers to become ACTIVE
**Since this is earlier in the data register than first PIN used it does not increase the number of PIN's that are ACTIVE
***Since this later in the data register it does increase the number of ACTIVE PIN's by one 4.2.3.3.1. ADMIN PIN Code Only one ADMIN PIN Code may be issued or active at one time. It may only be changed using the CHANGE ADMIN PIN command and may not be deleted by the DELETE PIN command. A predetermined number of valid ADMIN PIN codes may be pre-programmed.

4.2.3.3.2. MANAGER PIN Codes

For example, 100 to 500 MANAGER PIN codes may be pre-programmed, with five being active. These users may, for example, create PIN codes, enroll transmitters, reset the clock, and "read" the Keysafe.

4.2.3.3.3. USER PIN Codes

For example, 1,000 to 2,000 regular user PIN codes may be pre-programmed into the device, with thirty being active. The USER PIN Codes may be assigned by either the ADMIN user or MANAGER level PIN users.

4.2.3.3.4. VENDOR EMPLOYEE Codes

VENDOR EMPLOYEE PIN codes differ from other PIN codes in that they cannot be programmed into the Keysafe directly, but only through the web portal and "pushed" to the Keysafe(s) via the two-way transceiver. They also differ in that they may be valid on multiple Keysafes. The six digit VENDOR EMPLOYEE PIN can be selected or randomly generated. The back end database may need to be searched to ensure the pushed PIN is unique on all of the Keysafes selected to receive this new PIN.

Next wireless commands may be broadcast to all of the boxes enabling the new VENDOR EMPLOYEE PIN. The vendor employee may be emailed or otherwise notified that the PIN is now active.

4.2.3.3.5. ONE TIME Access PIN Codes

For example, 25 to 1500 ONE TIME Access PIN codes may be pre-programmed into the device, with twenty being active. The ONE TIME Access PIN codes may be assigned by either the ADMIN user or MANAGER level PIN users.

4.2.3.3.6. LIMITED TIME Access PIN Codes

For example, multiple four-digit PIN Codes may be generated via website and may be decrypted by Keysafe for validity. 5000 LIMITED TIME PIN codes may be pre-programmed, with thirty being active. The LIMITED TIME PIN codes may be assigned by either the ADMIN user or MANAGER level PIN users.

4.2.3.4. TIME CODES

A TIME CODE may be generated by the web portal for use with ONE TIME and LIMITED TIME access PIN codes. For SP-Web level users this may be necessary to communicate, for example, the single day of the year a ONE TIME code is good for as well as the start date, start time, and end date for a LIMITED TIME access PIN code. For example, this may be done by encrypting the following information at the web portal and decrypting it on the box in much the same manner a PIN code is generated.

There are 1-365 days (3 digits) for a start date, 1-99 days (2 digits) for duration of limited access and 1-24 (2 digits) possible hours in the start day. For example, a Limited Time access code could be created that allowed entry on January 15th at 10:00 AM and lasted through January 19th. This could be represented by the number 015-04-10. A simple encryption algorithm may be utilized, which may, for example, add another digit for this purpose.

4.2.3.5. Keypad Operations

The SP-Access solution may be locally operated and may function as a standalone device. Some or all levels of the integrated access and reporting system may have the ability to be "locally programmed" for example via the keypad. The following local programming and/or information retrieval Options may be available in the SP Access solution.

4.3. Web Portal 4.3.1. Web User Operations 4.3.1.1. Keysafe DEVICE Registration

The purchaser of a Keysafe may register each device by "Serial Number" and "Registration Number" on the Web Portal. The purpose of this registration is to ensure both customer and device location information is captured before a unit is able to be used in the field. The Registration Number may be packaged in a tamper proof envelope to ensure only the end user can learn the pre-programmed PIN numbers and thereby prevent someone in the distribution chain from accessing this information.

4.3.1.2. Web SERVICES Registration

The SP-Web may include a Keysafe that may be mechanically and electronically identical to the SP-Access device. The SP-Web may provide for the optional subscription to web applications via the Web Portal.

4.3.1.3. ONE TIME Access Code Generation

For example, a six-digit PIN may be generated that may enable entry on a single day. An option to email or text the PIN along with information, such as the day it is valid and physical location of the Keysafe, may be offered on the website.

4.3.1.4. LIMITED TIME Access Code Generation 4.3.1.5. Add-Delete VENDOR Code 4.3.1.6. Add-Delete User PIN Code 4.3.2. SP-Data Base/National Operations Center (NOC)

4.3.2.1. Device Info 4.3.2.1.1. Keysafe Serial Number

May need to link valid PIN's and/or Vendor Codes to the device 4.3.2.1.2. Keysafe Master or Registration Code 4.3.2.1.3. Keysafe Registration (ADMIN) PIN 4.3.2.1.4, Keysafe Physical Address (Location)

4.3.2.1.5. Keysafe Location Identifier

This may allow customers to identify individual units for installations with, for example, more than one Keysafe. For example, "Burger Restaurant North" that has multiple locations.

4.3.2.1.6. Keysafe Location Phone 4.3.2.1.7. Keysafe Manager Phone 4.3.2.1.8. Services Level

| | | |
|---|---|---|
| 4.3.2.2. User Info | | |
| | 4.3.2.2.1. | User Name |
| | 4.3.2.2.2. | User Address |
| | 4.3.2.2.3. | User Phone Number |
| | 4.3.2.2.4. | User PIN |
| | 4.3.2.2.5. | ONE TIME PIN (Y/N) |
| | 4.3.2.2.6. | One Time PIN MONTH |
| | 4.3.2.2.7. | One Time PIN DAY |
| | 4.3.2.2.8. | One Time PIN YEAR |
| | 4.3.2.2.9. | LIMITED TIME PIN (YIN) |
| | 4.3.2.2.10. | Limited Time PIN START |
| | 4.3.2.2.11. | Limited Time PIN END |
| | 4.3.2.2.12. | User Authorization Level |
| | | 4.3.2.2.12.1. Admin |
| | | 4.3.2.2.12.2. Manager |
| | | 4.3.2.2.12.3. User |
| | | 4.3.2.2.12.4. Vendor |
| | 4.3.2.2.13. | Access Times |
| | 4.3.2.2.14. | VENDOR Number |
| 4.3.2.3. | Vendor Info | |
| | 4.3.2.3.1. | Company Name |
| | 4.3.2.3.2. | Company Address |
| | 4.3.2.3.3. | Company Phone |
| | 4.3.2.3.4. | Company Contact |
| | 4.3.2.3.5. | Vendor Code |
| | May set value to zero if not a vendor | |
| 4.3.2.4. | History Info | |
| | 4.3.2.4.1. | Valid PIN ACCESS Event (Keysafe, PIN, date, time) |
| | 4.3.2.4.2. | Valid VENDOR ACCESS Event (Keysafe, Vendor Code, date, time) |
| 4.3.3. | Reports | |
| | 4.3.3.1.1. Access history (90 days active) | |
| | | 4.3.3.1.1.1. By Keysafe (location) |
| | | 4.3.3.1.1.2. By User/PIN, date & time |
| | | 4.3.3.1.1.3. By Vendor/Company, date & time |
| | 4.3.3.1.2. Programming Activity | |
| | | 4.3.3.1.2.1. By user-PIN access hours-days keysafe authorizations (PIN added to potentially multiple devices) |
| | | 4.3.3.1.2.2. By keybox serial number PIN #'s added & deleted Vendor codes added & deleted |

4.4. Battery Jumper 4.4.1. Mechanical Requirements

The device may contain batteries, such as a single AA disposable battery, that may be user replaceable with no or simple tools (e.g., coin, screwdriver). An injection molded case, housing two custom electrical contacts, a circuit board, and battery may be included. The ID of the housing may identify it with the Keysafe with appropriate external markings and labels.

4.4.2. Electronic Requirements

When the two electrical contacts of the device are connected to the corresponding contacts of the Keysafe it may wake up the motherboard and trigger it to send a query to the display asking for a valid ADMIN or MANAGER code. If both are entered successfully, the key pouch may release exposing the Keysafe battery door. The battery may then be replaced for normal operation.

4.4.3. Environmental Requirements

May survive intact and function after, for example, a four-foot drop onto concrete from any orientation.

4.4.4. Regulatory Requirements 4.5. Communications Gateway 4.5.1. Mechanical Requirements For example, an injection molded case, housing a Two Way Transceiver Module, GPRS printed circuit board (GSM PCB), DC transformer, battery backup (24 hours), key switch, and/or contact output for direct wire shunting. The Gateway may also have a terminal block to accept a pair of hardwired leads from the "programmable output" of the panel. Another two terminal block and relay may allow the control of auxiliary devices such as magnetic door latches. Two external antennas may be provided that mount at right angles to each other and protrude from the case. The antennas may mount to the PCB via a terminal block and exposed lead. A second set of internal antennas for 900 Mhz communications may be provided. The ID of the housing may identify it with the Keysafe with appropriate external markings and labels.

4.5.2. Electronic Requirements

The enclosure may be wall mounted and powered by an external transformer 120 VAC to 9 VAC. A 1.2 Amp-hour battery may be included for backup.

A six position terminal block with:

Two positions for AUX: 0.5 Amp, used for controlling magnetic locks and other auxiliary devices. This may require a latching key switch to keep a lock open all day.

Two positions for ALARM: 0.5 Amp, used for arming and disarming the panel.

Two positions for INPUT: Input Low: both positions at same voltage, Input HIGH: position 2 5 to 14 volts above position 1, input will draw about 5 mA (labeled INPUT− and INPUT+ respectively)

Power may be provided to the GPRS printed circuit board via a 22 pin connector.

4.5.3. Environmental Requirements

Operation Temperature Range (e.g., 0 to 120 degrees Fahrenheit)

4.5.4. Regulatory Requirements 4.6. Two Way Transceiver

May utilize, for example, 9600 Baud, Communications Protocol Modbus.

5. Installation

Installation may be able to be achieved without substantial modification of doorframe. Lag screws and/or bolts may be used to secure the device to the mounting surface. If mounted on a retail door front a "through door" mounting approach may be used. Mounting holes may be drilled through the doorframe and nuts/bolts may be used to secure the device to the door. A plastic cover may be provided for coverage of the nuts/bolts on the inside frame of the door.

6. Documentation 6.1. Quick Start Reference

Multiple quick-start reference manuals may be created. Alternatively, a single generic document may suffice. As much material as possible may be made available via a website, for example to minimize printing costs and ensure updated materials are continually available.

6.1.1. Device Specific Information

The following information may be provided in documentation form:

Keysafe Serial Number

Registration PIN

A blank spot may be provided for a customer to write in his "device master code" after he registers on the website. He may be instructed to protect this number and understand that it may be required the first time he programs his device.

7. Exemplary Environmental Performance Requirements

Shipping and Storage

Temperature Range:

−10° to 60° C. (14° to 140° F.)

Drop Resistance:

Internal product may not suffer damage from drops of 90 cm (36 in.) onto bare concrete on any exposed face or corner.

Vibration:

Internal packaging may prevent abrasion damage to product for typical transport frequencies and intensities.

System Requirements

Temperature Range:

0° to 50° C. (32° to 122° F.)

Ultraviolet Stability:

May not fade more than typical outdoor engineered products when exposed to sun for 5 years.

Chemical Resistance:

Resist likely cleansers and chemicals used on commercial store fronts.

Water/Dust Resistance:

IP54, limited dust ingress and protected from water spray from any direction.

Regulatory.

FCC Part 15, PTCRB Certification

As described throughout this disclosure, the integrated access management and reporting system may include one or more of the following capabilities.

False alarms are a growing and costly issue in businesses and residential locations. False alarms typically result when an alarm has been turned on, a door is opened activating the alarm, and the user fails to enter a valid security panel P1N. A situation may also occur where the person accessing the property is unaware of the alarm or does not know that the alarm is turned on and simply fails to get to the keypad prior to the alarm being activated.

The integrated access management and reporting system may enable the security keypad to be moved from its normal interior installation to an exterior location. This means that false alarms may be eliminated because the user cannot gain access to the building without first entering a valid PIN and gaining access to the mechanical key. In businesses/residences that use mechanical locking systems, the alarm system may be "activated" when the primary access door has been opened. Employees, vendors or homeowners may open the door with a mechanical key and then may proceed to the alarm keypad to disarm/turn off the system prior to the alarm activating and transmission of an "alarm event" to the central monitoring station.

The Access-Web-Security system may uniquely provide an integrated electronic key storage device that also functions as a wireless security keypad. This integration may allow the alarm system to be turned upon a valid access to the electronic keysafe.

The keysafe, a ruggedized metal locking vault with an integrated electronic display and keypad may include an RF wireless transmitter. The transmitter may be manufactured to transmit at frequencies and with protocols that allow it to "speak the RF language" of a variety of electronic security control panels.

When a keysafe is opened using a valid PIN and depresses the security option key (e.g., "*" key to turn off alarm-"#" key to turn on alarm), the keysafes RF transmitter may send an instruction signal (turn on-turn off) to the existing alarm panel. The alarm panel may receive the command via its RF transceiver and performs the requested command.

The integrated access management and reporting system may enable immediate transmission of access information via on-board RF communication to the communications gateway. The communications gateway may include a GPRS radio or other device that may provide for wireless transmission of the access info to the data center. The integrated access management and reporting system may thus have the capability to electronically store a key, enable access to that key via an electronic keypad and PIN number, and then immediately transmit that access data via an on-board RF transmitter to a GPRS based communication gateway. The system may include a completely self-contained access/key control system requiring no external power or physical network connectivity.

The on-board two-way RF transceiver and the cellular communications capability of the communications gateway may provide for remote programming of the keysafe. This capability may allow the owner/manager of a device to change the access authorizations in a stand-alone electronic access device without the need to physically program the device through its electronic keypad. For instance, the owner of multiple fast food restaurants may authorize a vendor to deliver food products after business hours on an unattended basis. The owner could assign this company a 'vendor code" to gain access to the keysafe at each restaurant location, if the owner were to terminate his contract with this supplier, he could delete the vendor code "in each keysafe using the web-based application with RF & cellular connectivity function.

One issue that may be found with access control systems is the potential misuse of an access badge, or access code. Unless the system has biometric capabilities, it cannot determine if the user is valid if they are in possessions of a valid badge and/or access code.

The integrated access management and reporting system may provide a method for validating, after the fact, that a valid employee or vendor accessed a location. The keysafe may activate a video surveillance camera that is focused on the primary location point.

The keysafe, a ruggedized metal locking vault with an integrated electronic display and keypad may include an RF wireless transmitter. The transmitter may be manufactured to transmit at frequencies and with protocols that allow it to "speak the RF language" of a variety of electronic security control panels. When a keysafe is opened using a valid PIN, the RF transmitter may send an instruction signal to activate a specific security video camera.

Figure 6:
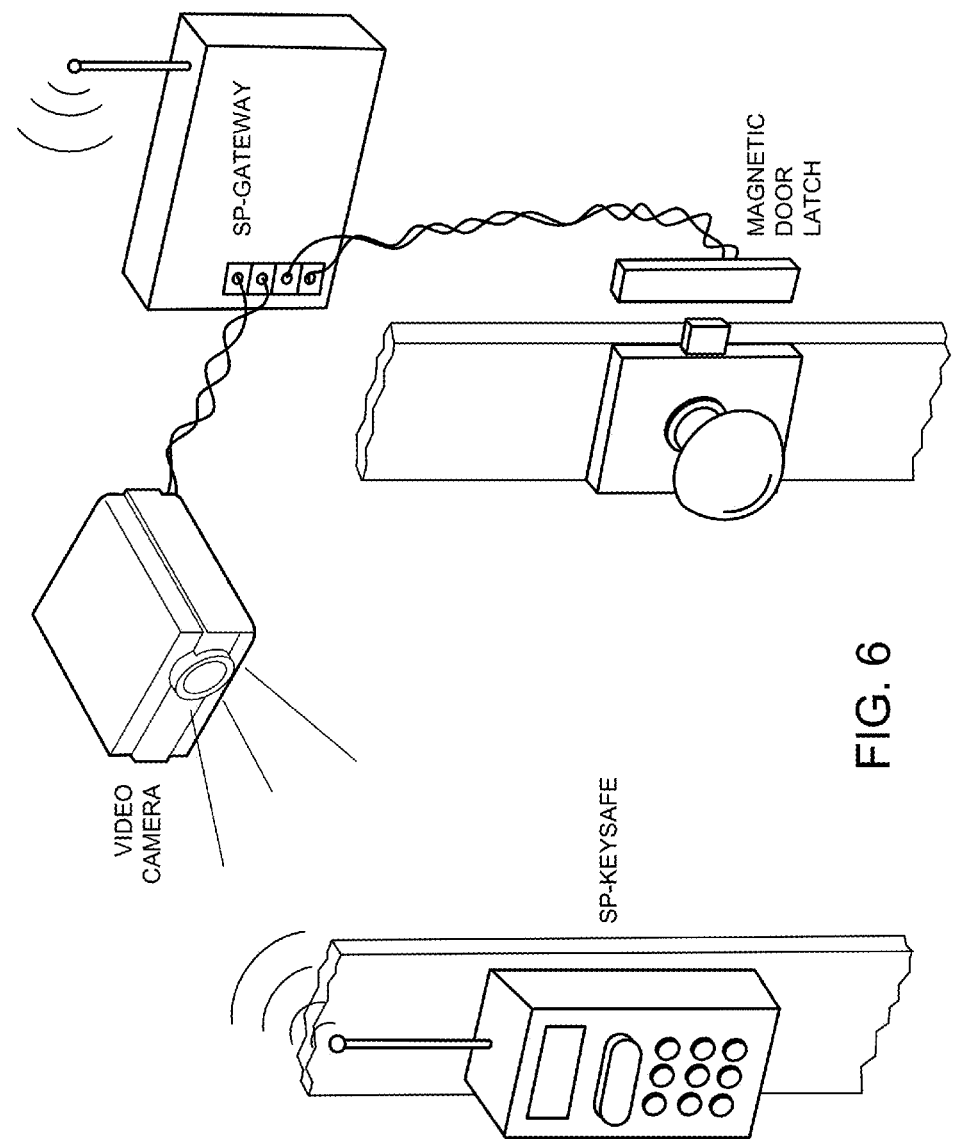
FIG. 6 is a schematic view of a further example of an integrated access management and reporting system.

As shown in FIG. 6, the key pad on an exemplary Keysafe may be used to perform functions, such as one or more of the following: (1) automatically turn on a video camera to record comings and goings through a door, (2) act as a keypad for a remotely wired magnetic door latch, and (3) control virtually any security access control device that may be simply turned on or off. By performing functions such as these, a battery-powered Keysafe may control hardwired devices that may not rely upon the Keysafe for power.

Figure 7:
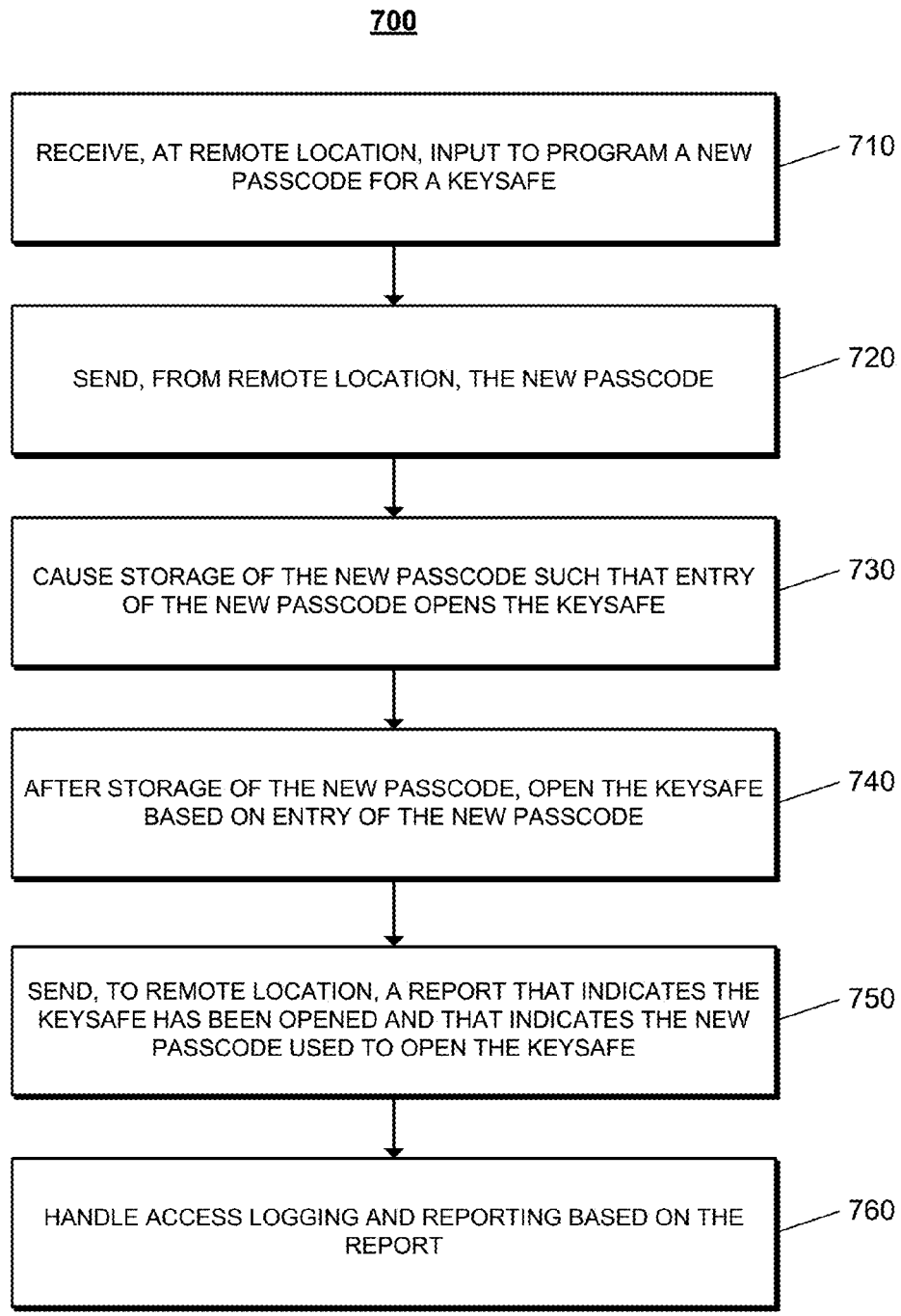
FIGS. 7, 9, 11, and 13 are flow charts illustrating example processes.

FIG. 7 illustrates an example process 700 for managing an electronic lockbox or keysafe. The operations of the process 700 are described generally as being performed by the system 100. The operations of the process 700 may be performed by one of the components of the system 100 or may be performed by any combination of the components of the system 100. The operations of the process 700 also may be performed by one of the components of the systems shown in FIGS. 2-6 or may be performed by any combination of the components of the systems shown in FIGS. 2-6. In some implementations, operations of the process 700 may be performed by one or more processors included in one or more electronic devices.

The system 100 receives, at a remote location, input to program a new passcode for a keysafe (e.g., an electronic lockbox) (710). For example, the server 110 may receive a request from an owner of the building 130 to add a new passcode to the lockbox 132. In this example, the new passcode may be a new passcode that has indefinite validity, a new passcode that is valid for a single use (e.g., a one-time use passcode), or a new passcode that is valid for a particular time period (e.g., a new passcode that is valid for the next two weeks or a new passcode that is valid indefinitely, but only on Sundays between the hours of 6 PM to 11 PM.

The system 100 sends, from the remote location, the new passcode (720). For instance, the server 110 sends the new passcode to the lockbox gateway 134 over the long-range communication protocol. The server 110 also may send any restriction information on use of the new passcode, such as a limit on the number of uses that the new passcode is valid or a limit on the time period for which the new passcode is valid.

The system 100 causes storage of the new passcode such that entry of the new passcode opens the keysafe (730). For instance, when the lockbox 132 performs decision making operations, the lockbox gateway 134 may send the new passcode to the lockbox 132 over a short-range communication protocol to have the lockbox 132 store the new passcode for comparison against passcodes entered at the lockbox 132. When the lockbox gateway 134 performs decision making operations, the lockbox gateway 134 may store the new passcode for comparison against passcodes sent from the lockbox 132. The system 100 may cause storage of any restriction information with the new passcode, so the restriction on use can be followed.

After storage of the new passcode, the system 100 opens the keysafe based on entry of the new passcode (740). For instance, when the lockbox 132 performs decision making operations, the lockbox 132 compares an inputted passcode with the new passcode stored at the lockbox 132, determines that the inputted passcode matches the new passcode based on the comparison, and opens the lockbox 132 based on the determination that the inputted passcode matches the new passcode. When the lockbox gateway 134 performs decision making operations, the lockbox gateway 134 receives an inputted passcode from the lockbox 132, compares the inputted passcode with the new passcode stored at the lockbox gateway 134, determines that the inputted passcode matches the new passcode based on the comparison, and sends a command to the lockbox 132 to open the lockbox 132 based on the determination that the inputted passcode matches the new passcode. In determining whether to open the lockbox 132, the system 100 may consider any restriction information stored with the new passcode to ensure that the new passcode is valid at a time when the new passcode is being input.

The system 100 sends, to the remote location, a report that indicates the keysafe has been opened and that indicates the new passcode used to open the keysafe (750). For example, when the lockbox 132 performs decision making operations, the lockbox 132 sends a report message to the lockbox gateway 134 to indicate that the lockbox 132 has been opened using the new passcode at a particular time. In this example, the lockbox gateway 134 relays the report message to the server 110. When the lockbox gateway 134 performs decision making operations, the lockbox gateway 134 sends a report message to the lockbox gateway 134 to indicate that the lockbox 132 has been opened using the new passcode at a particular time.

The system 100 handles access logging and reporting based on the report (760). For instance, the server 110 stores data indicating that the lockbox 132 has been opened using the new passcode at the particular time based on the report message. The server 110 may log the access to the lockbox 132 and generate various reports that show access history of the lockbox 132. The server 110 may generate reports for any of the lockboxes managed by the server 110 and can produce reports for groups of lockboxes operated by a single entity. The server 110 also may generate reports for accesses to lockboxes made by one or all of a particular vendor's employees.

The server 110 further may compare the reported access to a set of one or more alert rules. The alert rules may define when an entity that operates the lockbox 132 wishes to receive alerts based on the lockbox 132 being accessed. For instance, based on the alert rules, the server 110 may alert the entity every time the lockbox 132 is accessed, when the lockbox 132 is accessed between the hours of 12 AM to 5 AM, when the lockbox 132 is accessed three or more times within an hour time period, etc. The server 110 may alert the entity by sending the entity an electronic message (e.g., electronic mail message, text message, etc.), by posting an alert to a web page accessible to the entity, or by any other suitable alert technology.

The server 110 also may alert the entity when an access to the lockbox 132 is expected, but does not occur. For instance, the alert rules may indicate that the lockbox 132 is expected to be accessed between 9 PM and 11 PM on Mondays for a recurring delivery and between 9 AM and 10 AM every day for store opening. When the server 110 determines that a report of an access to the lockbox 132 has not been received between 9 PM and 11 PM on a Monday or between 9 AM and 10 AM any day, the server 110 may alert the entity that an expected access has not occurred. This may assist the entity in more quickly learning of issues relevant to operation of the building and addressing the issues.

Figure 8A:
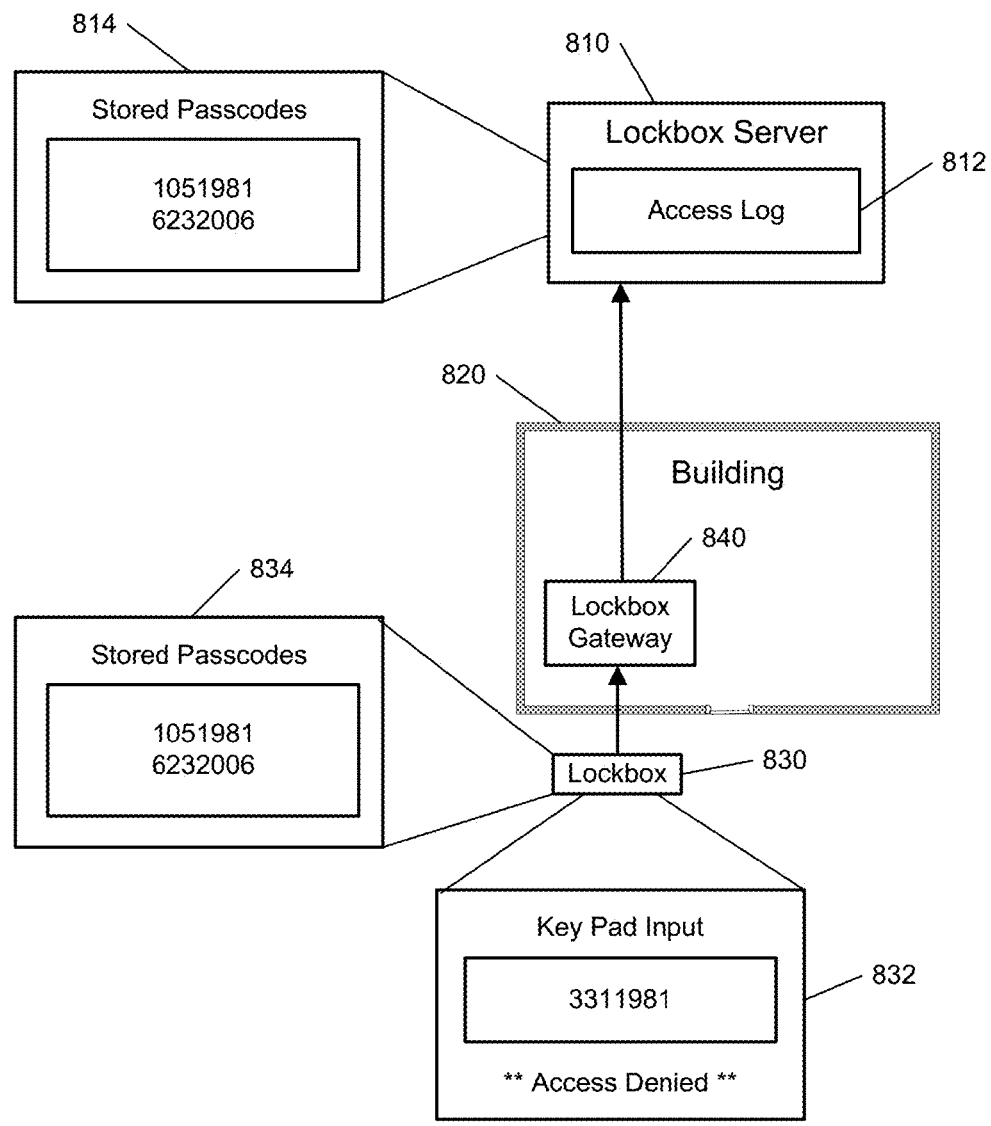
FIGS. 8A-8C illustrate an example of remotely programming passcodes to electronic lockboxes.
Figure 8B:
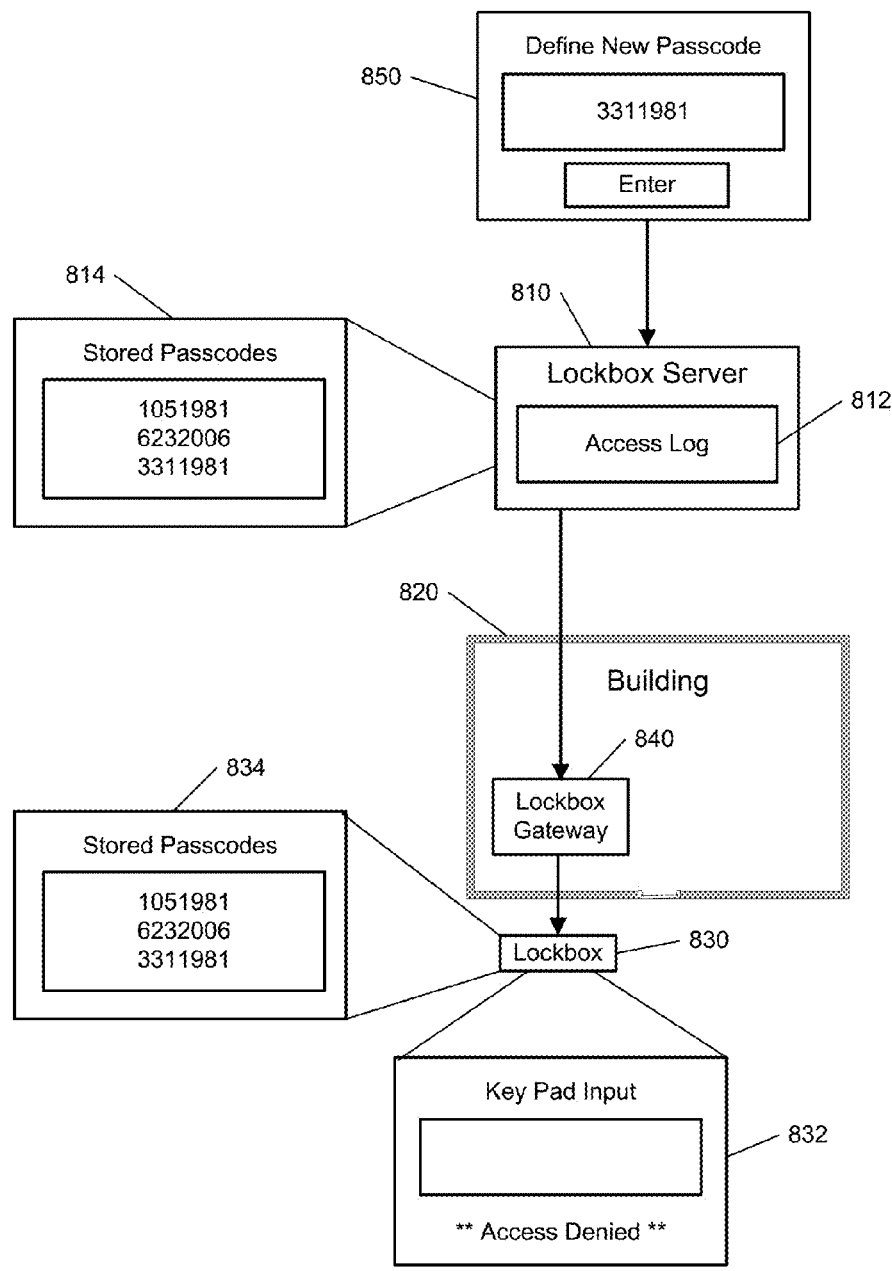
Figure 8C:
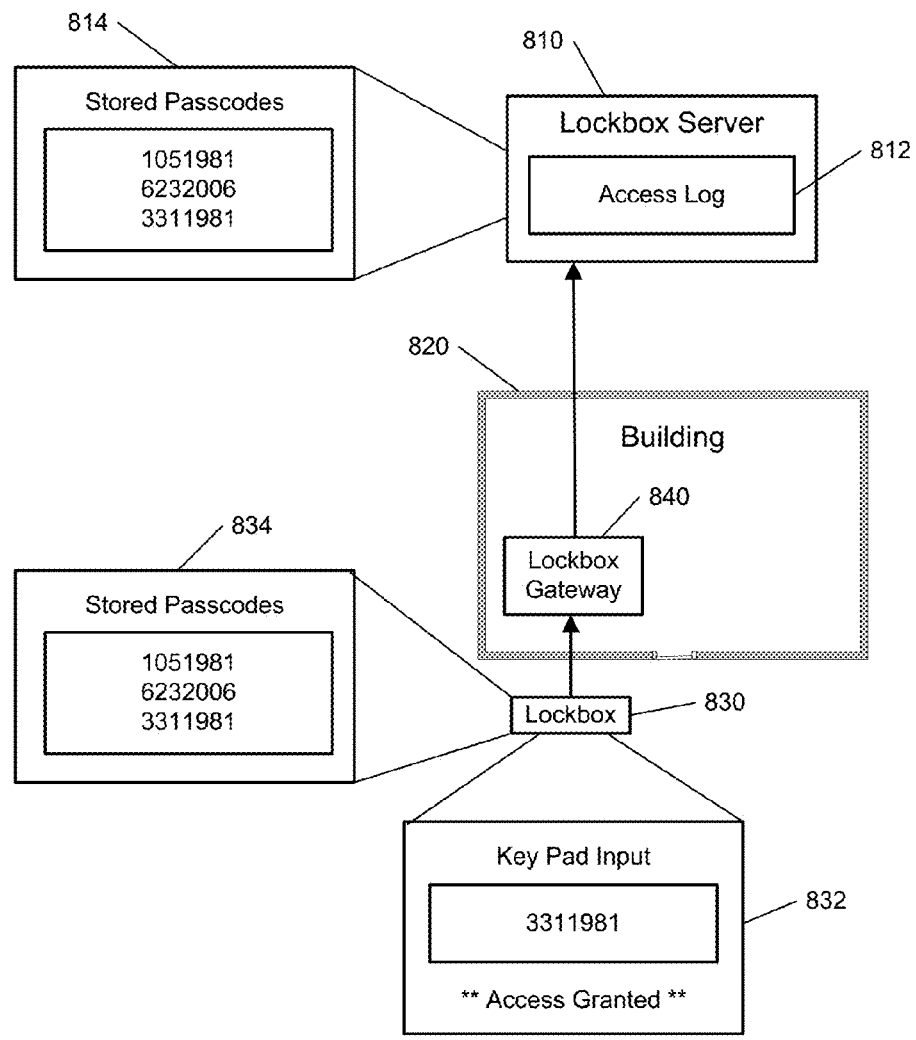

FIGS. 8A-8C illustrate an example of remotely programming passcodes to electronic lockboxes. As shown in FIG. 8A, a lockbox server 810 maintains an access log 812 and a database of valid passcodes that includes stored passcodes 814 for a lockbox 830 located at an external door of a building 820. The lockbox 830 has a key pad input device 832 that receives numeric character input and stored passcodes 834 for the lockbox 830. The stored passcodes 834 match the stored passcodes 814 because the lockbox server 810 keeps its passcode database synchronized with valid passcodes stored at each electronic lockbox the lockbox server 810 manages. In the example shown in FIG. 8A, a user has entered the passcode "3311981." The lockbox 830 denies the entered passcode because it does not match any of the stored passcodes 834. In response to denying the entered passcode, the lockbox 830 outputs an access denied message and sends a report of the failed access attempt to a lockbox gateway 840, which relays the report of the failed access attempt to the lockbox server 810 for logging in the access log 812.

In the example shown in FIG. 8B, a new passcode interface 850 is displayed to an authorized user (e.g., owner of the building 820) of the lockbox 830. The new passcode interface 850 may be part of a web page provided by the lockbox server 810 and the authorized user may be viewing the new passcode interface 850 on a personal electronic device (e.g., smartphone, personal computer, etc.) that is remote from the lockbox server 810. In this example, the authorized user enters "3311981" as a new passcode to add to the lockbox 830 and presses an enter button to submit the new passcode to the lockbox server 810. As shown, when the lockbox server 810 receives the new passcode, the lockbox server 810 adds the new passcode to the stored passcodes 814 for the lockbox 830 in the database of valid passcodes and also sends the new passcode to the lockbox gateway 840. The lockbox gateway 840 sends the new passcode to the lockbox 830 and the lockbox 830 adds the new passcode to the stored passcodes 834.

In the example shown in FIG. 8C, a user has entered the passcode "3311981" at a second time that is after storage of the new passcode. The lockbox 830 accepts the entered passcode because it matches the new passcode added to the stored passcodes 834 in the example shown in FIG. 8B. In response to accepting the entered passcode, the lockbox 830 outputs an access granted message, provides access to the key secured by the lockbox 830, and sends a report of the access to the lockbox gateway 840, which relays the report of the access to the lockbox server 810 for logging in the access log 812.

Figure 9:
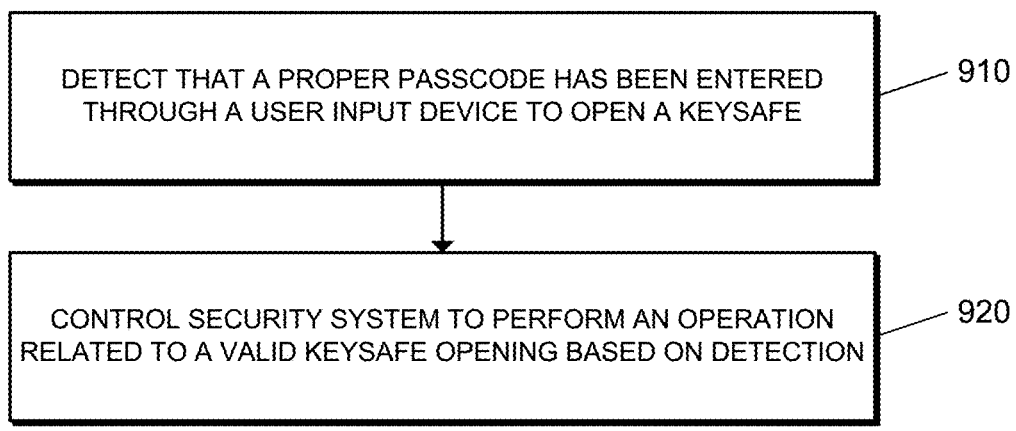

FIG. 9 illustrates an example process 900 for managing an electronic lockbox or keysafe. The operations of the process 900 are described generally as being performed by the system 100. The operations of the process 900 may be performed by one of the components of the system 100 or may be performed by any combination of the components of the system 100. The operations of the process 900 also may be performed by one of the components of the systems shown in FIGS. 2-6 or may be performed by any combination of the components of the systems shown in FIGS. 2-6. In some implementations, operations of the process 900 may be performed by one or more processors included in one or more electronic devices.

The system 100 detects that a proper passcode has been entered through a user input device to open a keysafe (910). For instance, the server 110 determines that a valid passcode has been entered at the lockbox 132 based on communications received from the lockbox gateway 134. In another example, the lockbox gateway 144 determines that a valid passcode has been entered at the lockbox 142 based on communications received from the lockbox 142.

The system 100 controls a security system to perform an operation related to a valid keysafe opening based on the detection that the proper passcode has been entered through the user input device to open the keysafe (920). For instance, the server 110 may control the alarm panel 136 to perform an operation related to a valid opening of the lockbox 132 based on the determination that a valid passcode has been entered at the lockbox 132. In another example, the lockbox gateway 144 may control the alarm panel 146 to perform an operation related to a valid opening of the lockbox 142 based on the determination that a valid passcode has been entered at the lockbox 142.

The system 100 may control the security system to perform any type of operation that may be desired. For instance, the system 100 may disarm the security system, turn on a light within the building, and/or begin operation of a video camera located at the building based on a valid opening of a lockbox.

Figure 10A:
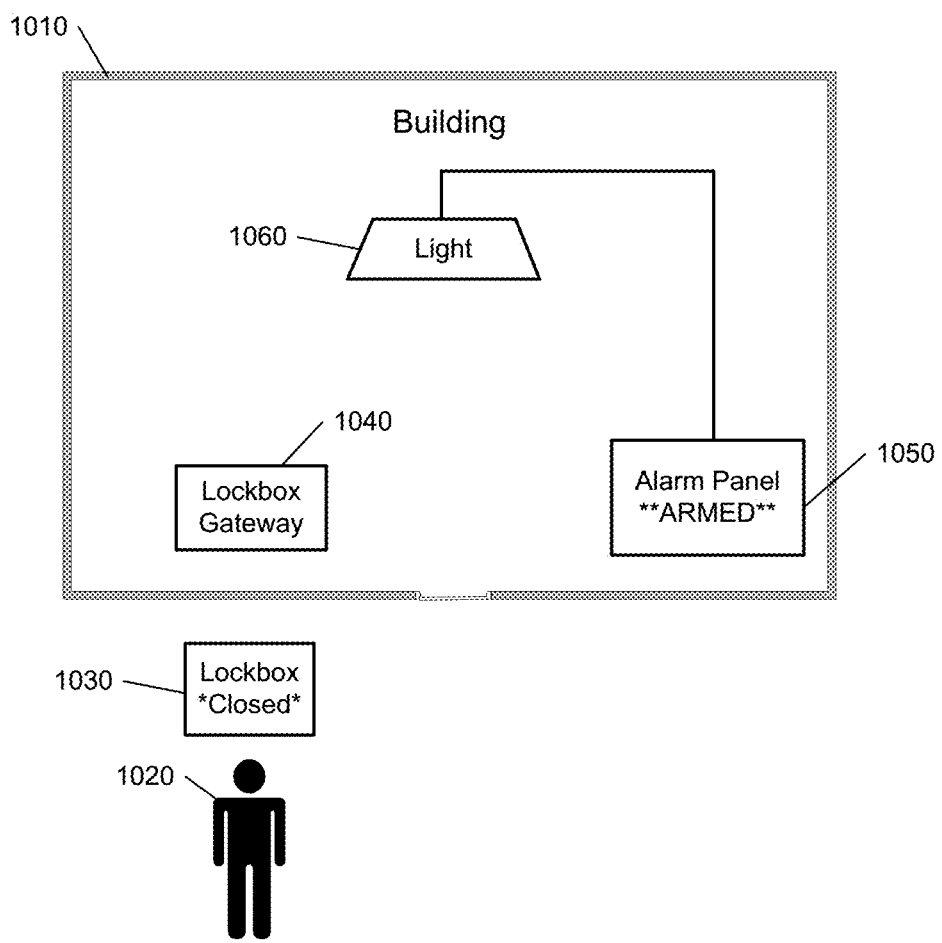
FIGS. 10A and 10B illustrate an example of controlling a security system based on input from an electronic lockbox.
Figure 10B:
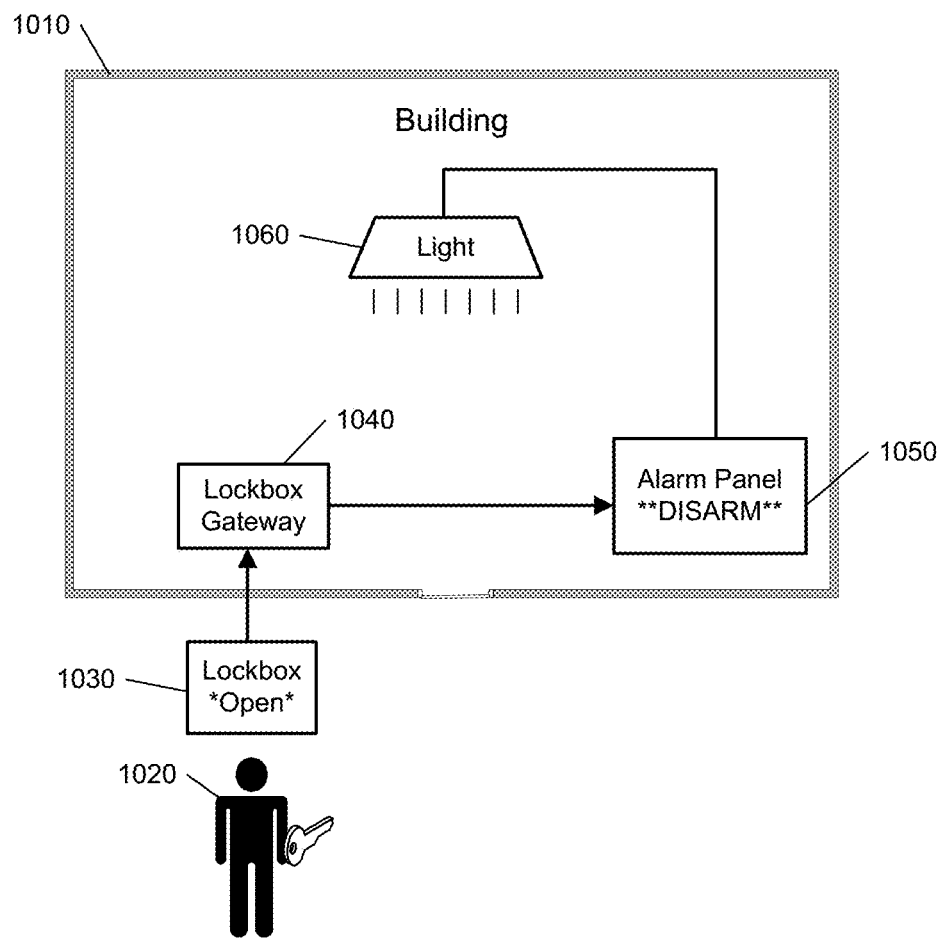

FIGS. 10A and 10B illustrate an example of controlling a security system based on input from an electronic lockbox. As shown in FIG. 10A, a user 1020 has approached a building 1010 that has an electronic lockbox 1030 located at an external door to the building 1010. The lockbox 1030 is in a closed state that secures a physical key to the building 1010 in the example shown in FIG. 10A. The building 1010 also has a lockbox gateway 1040 located within the building 1010, an alarm panel 1050 located within the building 1010, and a lighting device 1060 located within the building 1010. In the example shown in FIG. 10A, the alarm panel 1050 is in an armed state and the lighting device 1060 is in an off state.

In the example shown in FIG. 10B, the user 1020 has entered a proper passcode to the lockbox 1030 and retrieved a physical key secured by the lockbox 1030. Based on the entry of the proper passcode, the lockbox 1030 sends a message to the lockbox gateway 1040 to indicate the entry of the proper passcode. The lockbox gateway 1040 receives the message and sends a control command to the alarm panel 1050. The control command instructs the alarm panel 1050 to disarm the security system and also turn on the lighting device 1060. As shown, based on the control command, the alarm panel 1050 disarms the security system and turns on the lighting device 1060. Accordingly, the convenience of the user 1020 may be enhanced because the user 1020 does not have to disarm the security system or find a light switch when entering the building 1010. This may be particularly useful when the user 1020 is unfamiliar with the building 1010, such as a new driver of a delivery company.

Figure 11:
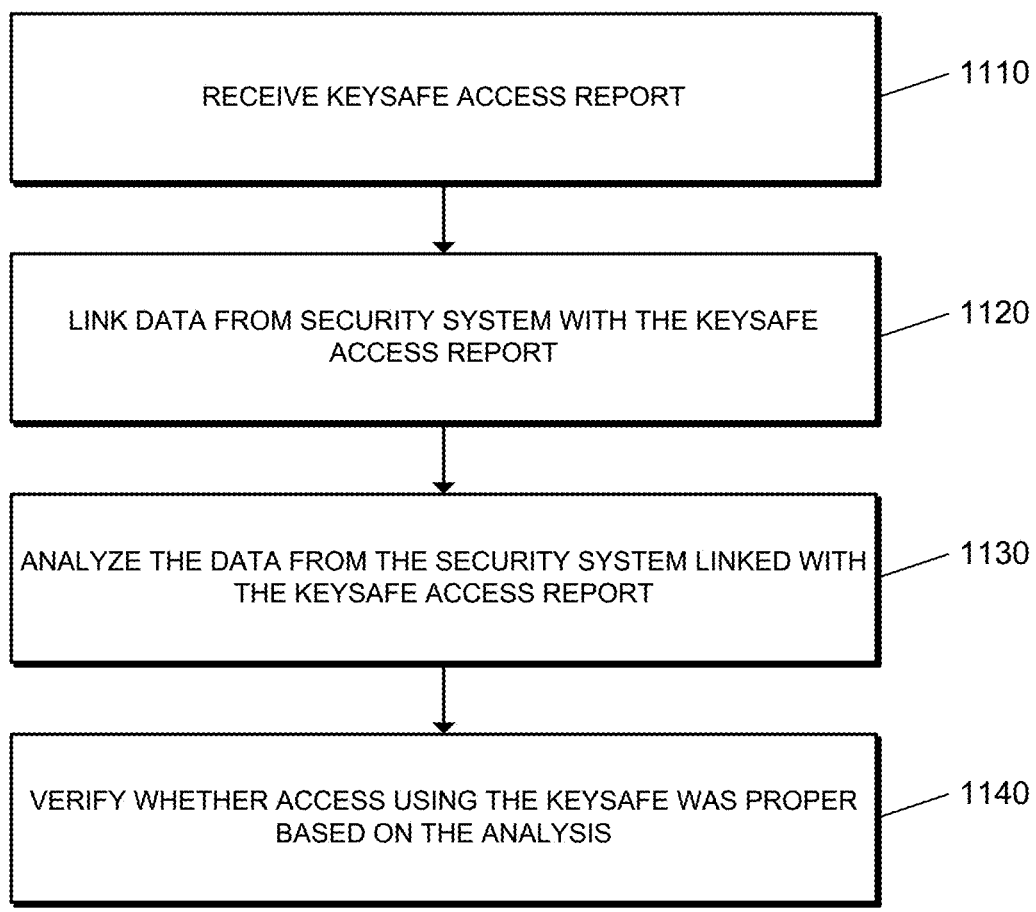

FIG. 11 illustrates an example process 1100 for managing an electronic lockbox or keysafe. The operations of the process 1100 are described generally as being performed by the system 100. The operations of the process 1100 may be performed by one of the components of the system 100 or may be performed by any combination of the components of the system 100. The operations of the process 1100 also may be performed by one of the components of the systems shown in FIGS. 2-6 or may be performed by any combination of the components of the systems shown in FIGS. 2-6. In some implementations, operations of the process 1100 may be performed by one or more processors included in one or more electronic devices.

The system 100 receives a keysafe access report (1110). For instance, the server 110 may receive a report message indicating that the lockbox 132 or the lockbox 142 has been accessed.

The system 100 links data from a security system with the keysafe access report (1120). For example, the server 110 also receives alarm data from the alarm panel 136 or the alarm panel 146 around the time of the access of the lockbox 132 or the lockbox 142. In this example, the server 110 detects a temporal relationship between the access of the lockbox and the received alarm data and links the temporally related alarm data with the access of the lockbox. The server 110 may detect a temporal relationship when the alarm data covers a time period that is within a first threshold amount of time prior to the access of the lockbox and when the alarm data covers a time period that is within a second threshold amount of time after the access of the lockbox. The first threshold amount of time may be less than the second threshold amount of time. Also, the server 110 may link alarm data that is outside of the first threshold amount of time or the second threshold amount of time when the alarm data is close enough to other linked alarm data such that it reflects continuous activity.

The system 100 analyzes the data from the security system linked with the keysafe access report (1130). For example, the server 110 compares the linked alarm data with a set of one or more access rules that define alarm events that are expected when the building is properly accessed using the lockbox. In this example, the access rules may define permitted areas of access and/or off-limit areas of access within the building and the server 110 may determine whether a person entering the building using the lockbox stays only within permitted areas and/or has entered an off-limit area.

The system 100 verifies whether access using the keysafe was proper based on the analysis (1140). For instance, the server 110 may determine whether the person entering the building using the lockbox has used the building properly based on the comparison of the alarm data to the access rules. The server 110 may verify that the access was proper when the alarm data indicates that the person only entered permitted areas within the building. The server 110 may determine that the access was improper when the alarm data indicates that the person entered an off-limit area within the building.

Figure 12:
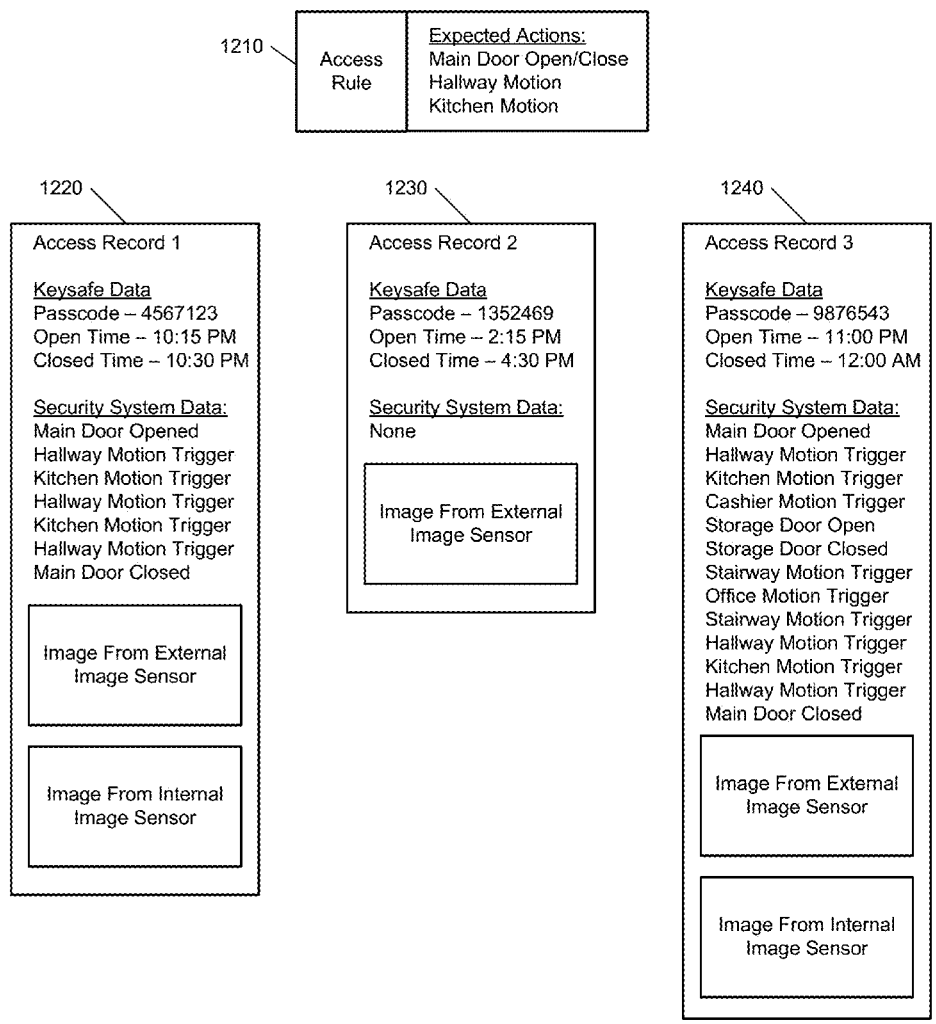
FIG. 12 illustrates an example access rule and example access records.

FIG. 12 illustrates an example access rule and example access records. In the example shown in FIG. 12, an access rule 1210 defines that, when the building is properly accessed using a keysafe or lockbox, certain actions are expected to be detected by the security system for the building. As shown, the access rule 1210 defines the expected actions as opening and closing of the main door, motion in the hallway, and motion in the kitchen. The access rule 1210 is compared against access records 1220, 1230, and 1240 that include keysafe access data and linked security system data for three different accesses of the building using the keysafe.

The access record 1220 includes keysafe data that shows that the keysafe was opened using passcode "4567123" at 10:15 PM and closed at 10:30 PM. The access record 1220 also includes linked security system data for events detected by the security system between the open time of the keysafe and the closed time of the keysafe. The access record 1220 further includes an image taken from an external image sensor located proximate to the keysafe and an image taken from an internal image sensor located within the building. To verify whether the access corresponding to the access record 1220 was proper, the security system data in the access record 1220 is compared to the access rule 1210. In this case, the comparison reveals that the access was proper because all of the security system events are included in the expected actions defined by the access rule 1210. The system also may send the images in the access record 1220 to an authorized user to verify whether the person accessing the building was actually the person associated with the passcode. The system further may perform facial recognition processing of the images in the access record 1220 to verify whether the person accessing the building was actually the person associated with the passcode.

The access record 1230 includes keysafe data that shows that the keysafe was opened using passcode "1352469" at 2:15 PM and closed at 4:30 PM. The access record 1230 does not include any linked security system data, but does include an image taken from an external image sensor located proximate to the keysafe. To verify whether the access corresponding to the access record 1230 was proper, the security system data in the access record 1230 is compared to the access rule 1210. In this case, the comparison reveals that the access was improper because none of the expected actions defined by the access rule 1210 were detected by the security system. The system may send an alert related to the improper access. The alert may indicate that the keysafe was accessed, but the building was never entered using the key. The system also may send the image in the access record 1230 to an authorized user, so the authorized user can see who engaged in the improper access.

The access record 1240 includes keysafe data that shows that the keysafe was opened using passcode "9876543" at 11:00 PM and closed at 12:00 AM. The access record 1240 also includes linked security system data for events detected by the security system between the open time of the keysafe and the closed time of the keysafe. The access record 1240 further includes an image taken from an external image sensor located proximate to the keysafe and an image taken from an internal image sensor located within the building. To verify whether the access corresponding to the access record 1240 was proper, the security system data in the access record 1240 is compared to the access rule 1210. In this case, the comparison reveals that the access was improper because some of the security system events are not included in the expected actions defined by the access rule 1210. The system may send an alert related to the improper access. The alert may indicate that the person entered areas in the building that were not permitted. The system also may send the images in the access record 1240 to an authorized user, so the authorized user can see who engaged in the improper access.

Figure 13:
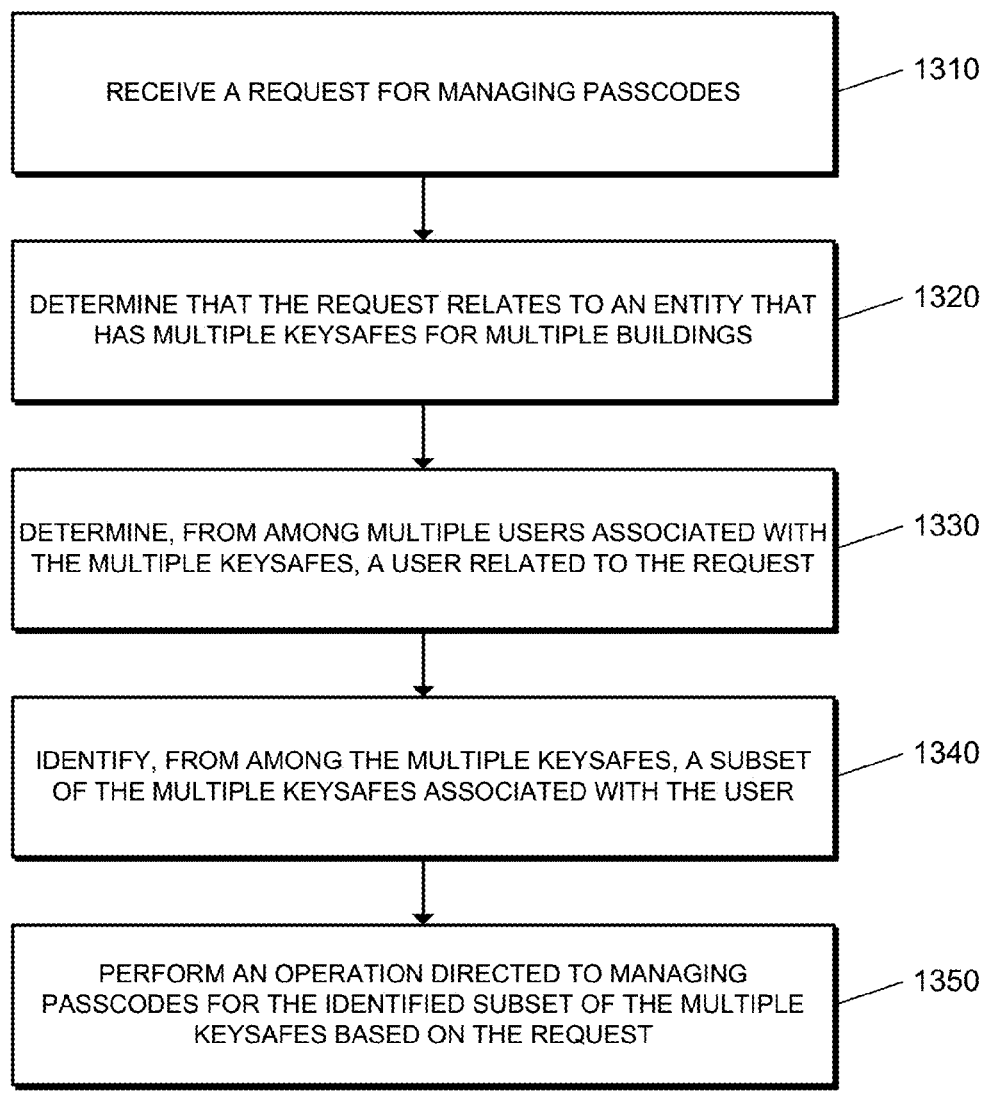

FIG. 13 illustrates an example process 1300 for managing an electronic lockbox or keysafe. The operations of the process 1300 are described generally as being performed by the system 100. The operations of the process 1300 may be performed by one of the components of the system 100 or may be performed by any combination of the components of the system 100. The operations of the process 1300 also may be performed by one of the components of the systems shown in FIGS. 2-6 or may be performed by any combination of the components of the systems shown in FIGS. 2-6. In some implementations, operations of the process 1300 may be performed by one or more processors included in one or more electronic devices.

The system 100 receives a request for managing passcodes (1310). For instance, the server 110 may receive a request from an owner of the building 130 or an authorized vendor to add a new passcode to the lockboxes 132 and 142, delete a passcode from the lockboxes 132 and 142, or change a passcode at the lockboxes 132 and 142. The request also may be a request to delete all passcodes associated with a particular vendor or to add a new vendor employee passcode to all keysafes or lockboxes associated with a particular vendor.

The system 100 determines that the request relates to an entity that has multiple keysafes for multiple buildings (1320). For example, the server 110 may determine that the request is associated with an entity that operates multiple keysafes for multiple buildings. In this example, the entity may be a business owner that operates a chain of multiple businesses at multiple locations (e.g., a chain of restaurants or retail stores).

The system 100 determines, from among multiple users associated with the multiple keysafes, a user related to the request (1330). For instance, the server 110 may determine that the request is associated with a particular vendor or service provider from among a group of authorized vendors or service providers. In another example, the server 110 may determine that the request is associated with a particular employee from among a group of authorized employees.

The system 100 identifies, from among the multiple keysafes, a subset of the multiple keysafes associated with the user (1340). For example, the server 110 identifies the keysafes that are associated with the identified user. In this example, the identified keysafes represent a subset of the multiple keysafes because the identified user is associated with some, but not all of the multiple keysafes of the entity. This may occur when the entity uses different vendors or service providers to service different of the multiple buildings.

The system 100 performs an operation directed to managing passcodes for the identified subset of the multiple keysafes based on the request (1350). For instance, the system 110 may add a new passcode to all of the identified subset of the multiple keysafes, delete a passcode from all of the identified subset of the multiple keysafes, or change a passcode at all of the identified subset of the multiple keysafes. In this regard, the system 100 may allow owners to quickly and easily change vendors or service providers used to service their buildings and also may allow vendors or service providers to quickly and easily change employees the vendors or service providers use to service the buildings.

Figure 14A:
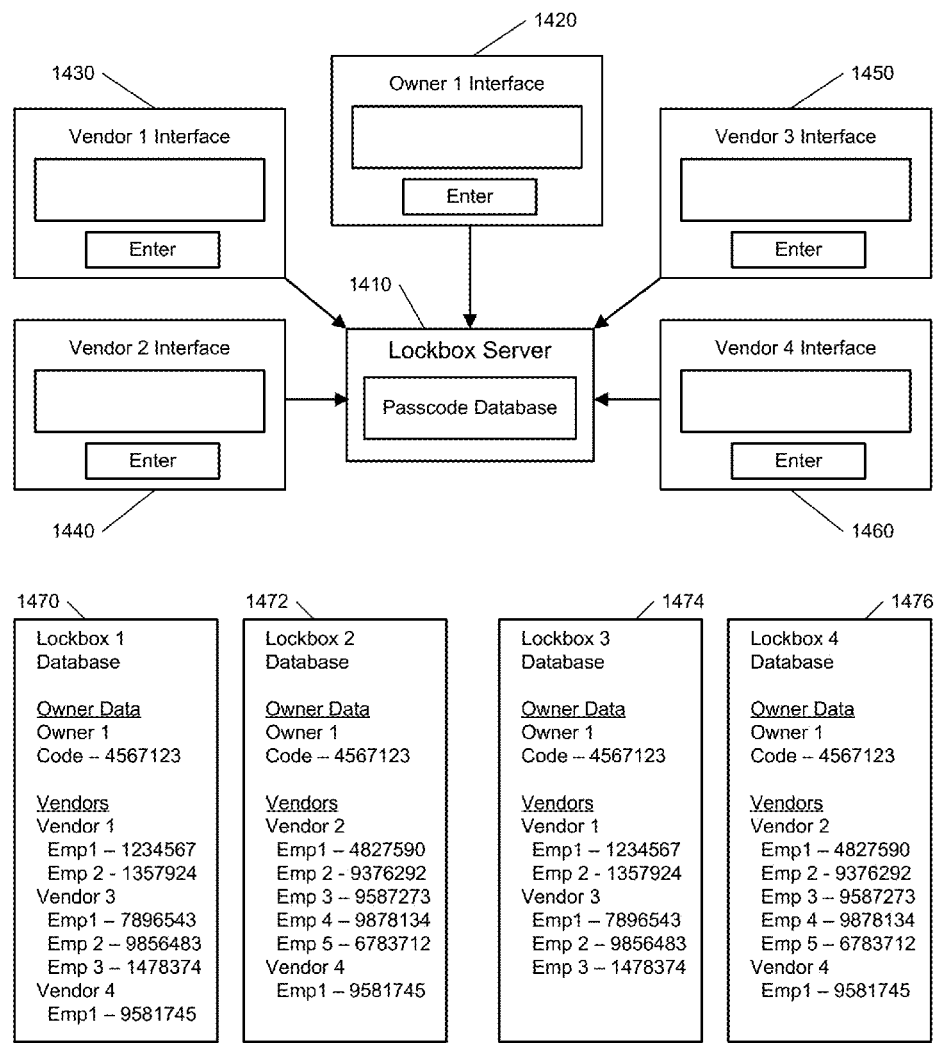
FIGS. 14A-14C illustrate examples of managing multiple electronic lockboxes.
Figure 14B:
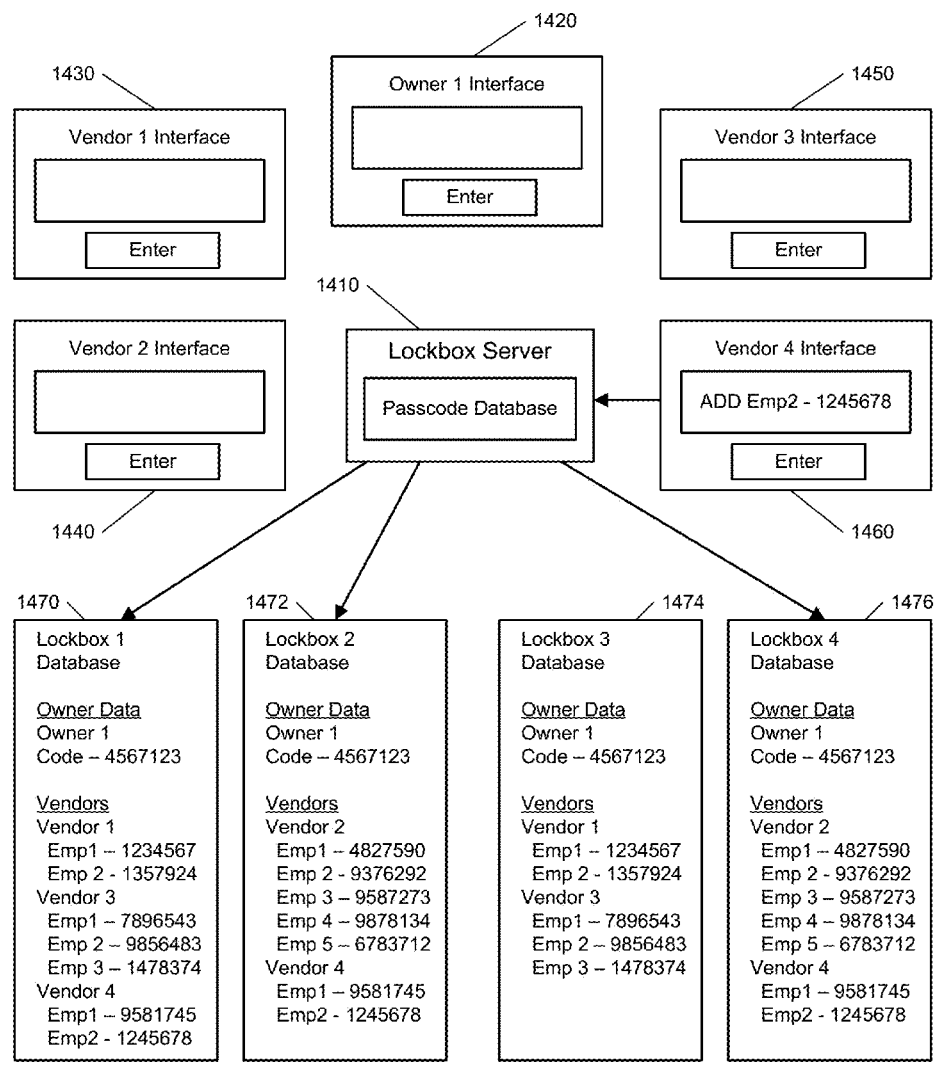
Figure 14C:
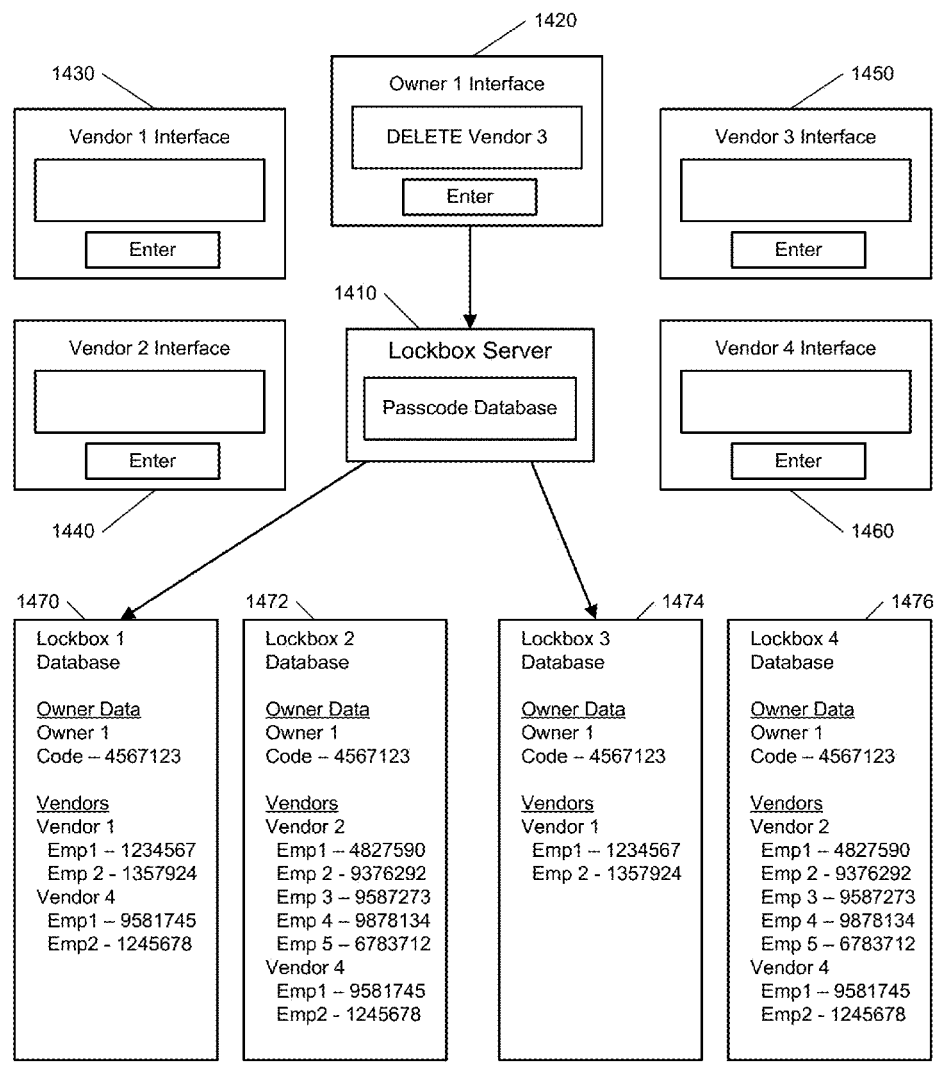

FIGS. 14A-14C illustrate examples of managing multiple electronic lockboxes. As shown in FIG. 14A, a lockbox server 1410 includes a master passcode database that is synchronized with passcode databases at each of the lockboxes serviced by the lockbox server 1410. In the example shown in FIG. 14A, passcode databases 1470, 1472, 1474, and 1476 at each of four lockboxes are shown for brevity, but many more passcode databases may exist. The lockbox server 1410 may receive passcode management requests from many sources. As shown, a first owner may submit passcode management requests using interface 1420, a first vendor may submit passcode management requests using interface 1430, a second vendor may submit passcode management requests using interface 1440, a third vendor may submit passcode management requests using interface 1450, and a fourth vendor may submit passcode management requests using interface 1460. In this example, the owner may have permission to manage passcodes for all of the lockboxes associated with the owner and the vendors may have permission to manage passcodes for all of the lockboxes associated with the vendors to the extent the owner has given the vendor permission to manage passcodes.

The passcode databases 1470, 1472, 1474, and 1476 show a present state of passcode data at each of the lockboxes. As shown, the passcode database 1470 has passcode data for the first owner and passcode data for the first vendor, third vendor, and fourth vendor. The passcode database 1472 has passcode data for the first owner and passcode data for the second vendor and fourth vendor. The passcode database 1474 has passcode data for the first owner and passcode data for the first vendor and third vendor. The passcode database 1476 has passcode data for the first owner and passcode data for the second vendor and fourth vendor.

In the example shown in FIG. 14B, the fourth vendor has submitted a request through the interface 1460 to add a new passcode for a second employee. In this example, the lockbox server 1410 determines that the request is related to the fourth vendor and that the fourth vendor is associated with the passcode databases 1470, 1472, and 1476, but not the passcode database 1474. Based on this determination, the lockbox server 1410 sends the new passcode for the second employee to the passcode databases 1470, 1472, and 1476, but not the passcode database 1474. As shown, the passcode databases 1470, 1472, and 1476 have been updated to include the new passcode for the second employee.

In the example shown in FIG. 14C, the first owner has submitted a request through the interface 1420 to delete the third vendor. In this example, the lockbox server 1410 determines that the request is related to the third vendor and that the third vendor is associated with the passcode databases 1470 and 1474, but not the passcode databases 1472 and 1476. Based on this determination, the lockbox server 1410 sends a command to delete all of the employee passcodes for the third vendor to the passcode databases 1470 and 1474, but not the passcode databases 1472 and 1476. As shown, the passcode databases 1470 and 1474 have been updated to remove all of the employee passcodes for the third vendor.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An access management system comprising:
   a communication module configured to grant access to a building and perform two-way communication over a short-range wireless communication protocol, comprising:
      a user input device configured to receive user input of a passcode; and
      a processor that operates the communication module to grant access to the building based on receipt of a proper passcode by the user input device;
   a monitoring system configured to monitor the building and collect sensor data;
   a communication system located within the building, configured to perform two-way communication with the communication module; and
   a server that is located remotely from the building and the communication module, and that is configured to perform two-way communication with the communication system located within the building;
   wherein the communication system is configured to detect that a proper passcode has been entered through the user input device and, based on the detection that the proper passcode has been entered through the user input device, control the monitoring system to perform an operation related to granting access to the building through input of the proper passcode, the operation being different than enabling access to the building; and
   wherein the monitoring system is configured to perform the operation related to granting access to the building through input of the proper passcode.

2. The access management system of claim 1:
   wherein the communication system is configured to control the monitoring system to perform the operation related to granting access to the building through input of the proper passcode by controlling, based on the detection that the proper passcode has been entered through the user input device, the monitoring system to change from an armed state in which opening of a physical door of an entrance to the building requires entry of a proper password for the monitoring system to stop the monitoring system from sending an alarm signal that results in a monitoring station dispatching emergency services to a disarmed state in which opening of the physical door of the entrance to the building does not require entry of the proper password; and
   wherein the monitoring system is configured to perform the operation related to granting access to the building through input of the proper passcode by changing from the armed state to the disarmed state based on the controlling.

3. The access management system of claim 1:
   wherein the communication system is configured to control the monitoring system to perform the operation related to granting access to the building through input of the proper passcode by controlling the monitoring system to turn on a light located within the building based on the detection that the proper passcode has been entered through the user input device; and
   wherein the monitoring system is configured to perform the operation related to granting access to the building through input of the proper passcode by turning on the light located within the building based on the controlling.

4. The access management system of claim 1:
   wherein the communication system is configured to control the monitoring system to perform the operation related to granting access to the building through input of the proper passcode by controlling the monitoring system to begin operation of a video camera located at the building based on the detection that the proper passcode has been entered through the user input device; and
   wherein the monitoring system is configured to perform the operation related to granting access to the building through input of the proper passcode by beginning operation of the video camera located at the building based on the controlling.

5. The access management system of claim 1:
   wherein the communication system is configured to control the monitoring system to perform the operation related to granting access to the building through input of the proper passcode by sending, to an alarm panel of the monitoring system, a control command that instructs the alarm panel to disarm the monitoring system and turn on a light located within the building; and
   wherein the monitoring system is configured to perform the operation related to granting access to the building through input of the proper passcode by the alarm panel disarming the monitoring system and turning on the light based on the control command.

6. The access management system of claim 1:
   wherein the communication system is configured to perform, over a long-range wireless communication protocol, two-way communication with the server; and
   wherein the server is configured to perform, over the long-range wireless communication protocol, two-way communication with the communication system located within the building.

7. The access management system of claim 1, wherein at least a portion of the communication system is part of the monitoring system.

8. The access management system of claim 1:
   wherein the monitoring system is configured to send, to the server, sensor data collected by the monitoring system; and wherein the server is configured to link sensor data from the monitoring system with a report that indicates that access to the building has been granted based on receipt of the proper passcode by the user input device.

9. The access management system of claim 8, wherein the server is configured to analyze the sensor data from the monitoring system linked with the report and verify, based on the analysis, whether access using the communication module was proper.

10. The access management system of claim 8:
wherein the monitoring system is configured to send, to the server, image data captured by an image sensor of the monitoring system; and
wherein the server is configured to link the image data captured the image sensor of the monitoring system with the report.

11. The access management system of claim 8:
wherein the monitoring system is configured to send, to the server, sensor data captured by at least one door sensor and at least one motion sensor; and
wherein the server is configured to link the sensor data captured by the at least one door sensor and the at least one motion sensor with the report.

12. The access management system of claim 1, further comprising multiple communication modules for multiple buildings,
wherein the server is located remote from each of the multiple buildings, is configured to manage access to each of the multiple communication modules, and is configured to handle reporting related to access of each of the multiple communication modules.

13. The access management system of claim 12:
wherein the server includes a passcode database that maintains passcodes valid at each of the multiple communication modules, and
wherein the server is configured to synchronize the passcode database with passcode storage associated with each of the multiple communication modules such that valid passcodes in the passcode storage at each of the multiple communication modules matches valid passcodes in passcode database for each of the multiple communication modules.

14. The access management system of claim 1, wherein the server is configured to:
receive a request for managing passcodes;
determine that the request relates to an entity that has multiple communication modules for multiple buildings, the multiple communication modules being associated with multiple users;
identify, from among the multiple users associated with the multiple communication modules, a user related to the request;
identify, from among the multiple communication modules, a subset of the multiple communication modules associated with the identified user; and
perform an operation directed to managing passcodes for the identified subset of the multiple communication modules based on the request.

15. The access management system of claim 14:
wherein the server is configured to receive the request for managing passcodes by receiving, from a vendor that services a first subset of the multiple buildings of the entity, a request to add a new employee passcode, the first subset of the multiple buildings comprising at least two, but less than all of the multiple buildings;
wherein the server is configured to identify, from among the multiple users associated with the multiple communication modules, the user related to the request by identifying, from among multiple vendors associated with the multiple communication modules, the vendor related to the request;
wherein the server is configured to identify, from among the multiple communication modules, the subset of the multiple communication modules associated with the identified user by identifying, from among the multiple communication modules, the first subset of the multiple communication modules serviced by the vendor; and
wherein the server is configured to perform the operation directed to managing passcodes for the identified subset of the multiple communication modules based on the request by adding, to each of the first subset of the multiple communication modules serviced by the vendor, the new employee passcode.

16. The access management system of claim 14:
wherein the server is configured to receive the request for managing passcodes by receiving, from the entity, a request to delete a vendor;
wherein the server is configured to identify, from among the multiple users associated with the multiple communication modules, the user related to the request by identifying, from among multiple vendors associated with the multiple communication modules, the vendor related to the request;
wherein the server is configured to identify, from among the multiple communication modules, the subset of the multiple communication modules associated with the identified user by identifying, from among the multiple communication modules, the subset of the multiple communication modules serviced by the vendor, the subset of the multiple communication modules serviced by the vendor comprising at least two, but less than all of the multiple communication modules; and
wherein the server is configured to perform the operation directed to managing passcodes for the identified subset of the multiple communication modules based on the request by deleting, from each of the subset of the multiple communication modules serviced by the vendor, employee passcodes for all employees of the vendor.

17. The access management system of claim 1:
wherein the server is configured to:
receive input to program a new, limited-use passcode for the communication module, and
based on the input to program the new, limited-use passcode for the communication module, send, over the long-range communication protocol to the communication system located within the building, the new, limited-use passcode for the communication module with a restriction that defines when the new, limited-use passcode is valid;
wherein the communication system is configured to:
receive, from the server over the long-range communication protocol, the new, limited-use passcode for the communication module with the restriction that defines when the new, limited-use passcode is valid, and
cause storage of the new, limited-use passcode for the communication module with the restriction that defines when the new, limited-use passcode is valid such that entry of the new, limited-use passcode at the user input device of the communication module allows access to the building when the entry occurs during a time period when the restriction defines the new, limited-use passcode as being valid;

wherein the processor of the communication module is configured to, after storage of the new, limited-use passcode with the restriction that defines when the new, limited-use passcode is valid, allow access to the building based on entry of the new, limited-use passcode through the user input device at a time when the restriction defines the new, limited-use passcode as being valid.

18. The access management system of claim 1:
wherein the processor of the communication module is configured to monitor an amount of battery power available to the communication module, detect when the amount of battery power available to the communication module falls below a threshold, and, based on detection that the amount of battery power available to the communication module has fallen below the threshold, send, over the short-range wireless communication protocol to the communication system, an alert indicating that the amount of battery power available to the communication module has fallen below the threshold;
wherein the communication system is configured to receive, from the communication module over the short-range wireless communication protocol, the alert indicating that the amount of battery power available to the communication module has fallen below the threshold and relay, over the long-range communication protocol to the server, the alert indicating that the amount of battery power available to the communication module has fallen below the threshold; and
wherein the server is configured to receive, from the communication system over the long-range communication protocol, the alert indicating that the amount of battery power available to the communication module has fallen below the threshold and send, to an entity responsible for the building, an electronic message indicating that the amount of battery power available to the communication module has fallen below the threshold.

19. A communication system comprising:
at least one processor; and
a non-transitory computer-readable storage medium configured to store instructions that, when executed by the at least one processor, cause the communication system to:
perform two-way communication with a communication module, the communication module being configured to grant access to a building and perform two-way communication over a short-range wireless communication protocol, the communication module comprising:
  a user input device configured to receive user input of a passcode; and
  a processor that operates the communication module to grant access to the building based on receipt of a proper passcode by the user input device;
perform two-way communication with a server that is located remotely from the building, the communication module, and the communication system;
detect that a proper passcode has been entered through the user input device; and
based on the detection that the proper passcode has been entered through the user input device, control a monitoring system to perform an operation related to granting access to the building through input of the proper passcode, the operation being different than enabling access to the building and the monitoring system being configured to monitor the building and collect sensor data.

20. A computer-implemented method comprising:
performing, by a communication system, two-way communication with a communication module, the communication module being configured to grant access to a building and perform two-way communication over a short-range wireless communication protocol, the communication module comprising:
  a user input device configured to receive user input of a passcode; and
  a processor that operates the communication module to grant access to the building based on receipt of a proper passcode by the user input device;
performing, by the communication system, two-way communication with a server that is located remotely from the building, the communication module, and the communication system;
detecting, by the communication system, that a proper passcode has been entered through the user input device; and
based on the detection that the proper passcode has been entered through the user input device, controlling, by the communication system, a monitoring system to perform an operation related to granting access to the building through input of the proper passcode, the operation being different than enabling access to the building and the monitoring system being configured to monitor the building and collect sensor data.

* * * * *